United States Patent [19]
Brinkman et al.

[11] Patent Number: 5,712,908
[45] Date of Patent: Jan. 27, 1998

[54] APPARATUS AND METHOD FOR GENERATING CALL DURATION BILLING RECORDS UTILIZING ISUP MESSAGES IN THE CCS/SS7 TELECOMMUNICATIONS NETWORK

[75] Inventors: Anthony J. Brinkman, West Chicago, Ill.; Yi Lin; Michael H. Penrod, both of Chesapeake, Va.; Nancy L. Sweet, Virginia Beach, Va.; Linda Trout-Jordan, Norfolk, Va.; Gerald J. Wardzinski, Virginia Beach, Va.

[73] Assignee: Unisys Corporation, Blue Bell, Pa.

[21] Appl. No.: 649,561

[22] Filed: May 17, 1996

Related U.S. Application Data

[60] Provisional application No. 60/009,129, Dec. 22, 1995.
[51] Int. Cl.⁶ .................................................. H04M 15/00
[52] U.S. Cl. ............................ 379/119; 379/34; 379/112; 379/230
[58] Field of Search ........................... 379/111, 112, 379/114, 115, 116, 119, 128, 135, 137, 138, 229, 230, 220, 221, 201, 207, 250, 252, 34, 120, 134, 126

[56] References Cited

U.S. PATENT DOCUMENTS

| | | | |
|---|---|---|---|
| 5,008,929 | 4/1991 | Olsen et al. | 379/115 |
| 5,218,632 | 6/1993 | Cool | 379/119 |
| 5,375,159 | 12/1994 | Williams | 379/22 |
| 5,430,719 | 7/1995 | Weisser, Jr. | 370/58.2 |
| 5,436,957 | 7/1995 | Nazif et al. | 379/207 |
| 5,488,648 | 1/1996 | Womble | 379/34 |
| 5,511,113 | 4/1996 | Tasaki et al. | 379/114 |
| 5,592,530 | 1/1997 | Brockman et al. | 379/34 |

*Primary Examiner*—Curtis Kuntz
*Assistant Examiner*—Binh K. Tieu
*Attorney, Agent, or Firm*—Albert B. Cooper; Mark T. Starr

[57] ABSTRACT

A computer platform with a Call Billing application thereon monitors linksets of the CCS/SS7 network extending between Local Exchange Carrier (LEC) Signaling Transfer Points (STP) and Competitive Access Provider (CAP) switches such as End Offices (EO) and Tandem Offices, where the CAP switches have access to the LEC switching offices in the LEC area for providing service therein. The platform receives SS7 Signal Units (SU) copied from the linksets and filters the SUs to pass ISUP MSUs of message types Initial Address Message (IAM), Exit Message (EXM), Address Complete Message (ACM), Answer Message (ANM), Reset Circuit Message (RSC) and Release Message (REL). The application correlates a received IAM against subsequently received and filtered ISUP messages in accordance with correlation search keys Originating Point Code (OPC), Destination Point Code (DPC) and Circuit Identification Code (CIC) so as to correlate the filtered ISUP MSUs that originate, set up and terminate a call. The elapsed time of the call is determined based on the difference between a call start time and a call end time where the start time is predicated on a call originating or setup MSU and the end time is predicated on a call terminating MSU. The call type can be for either "access" or "conversation" elapsed time depending on call direction and destination. Different ISUP MSU criteria are utilized for the two call types. For call type access, ACM may be utilized on which to base the start time, whereas for call time conversation, ANM may be utilized as the basis for the start time.

95 Claims, 13 Drawing Sheets

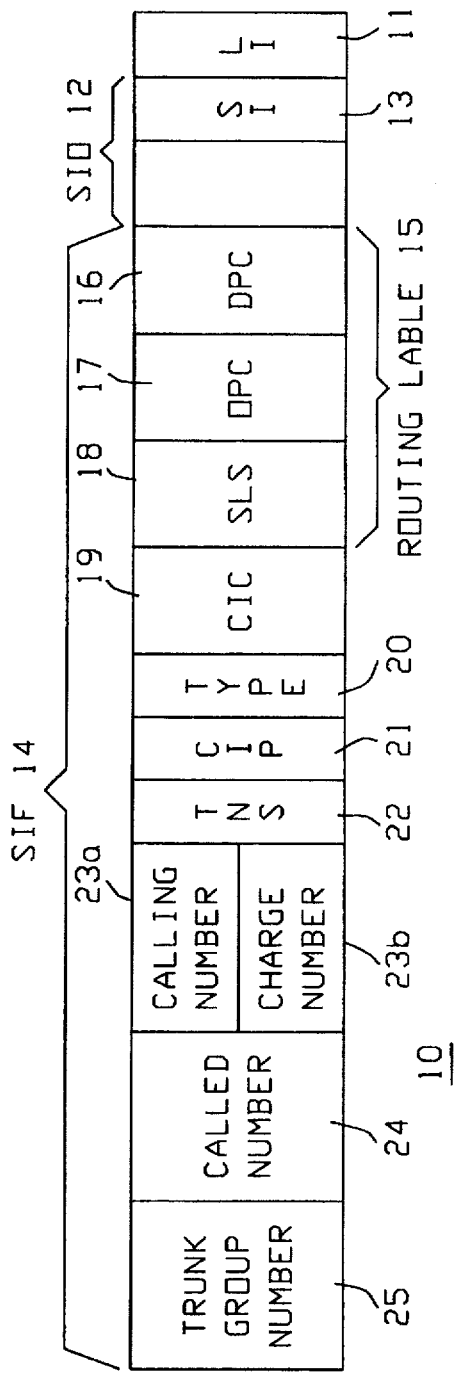
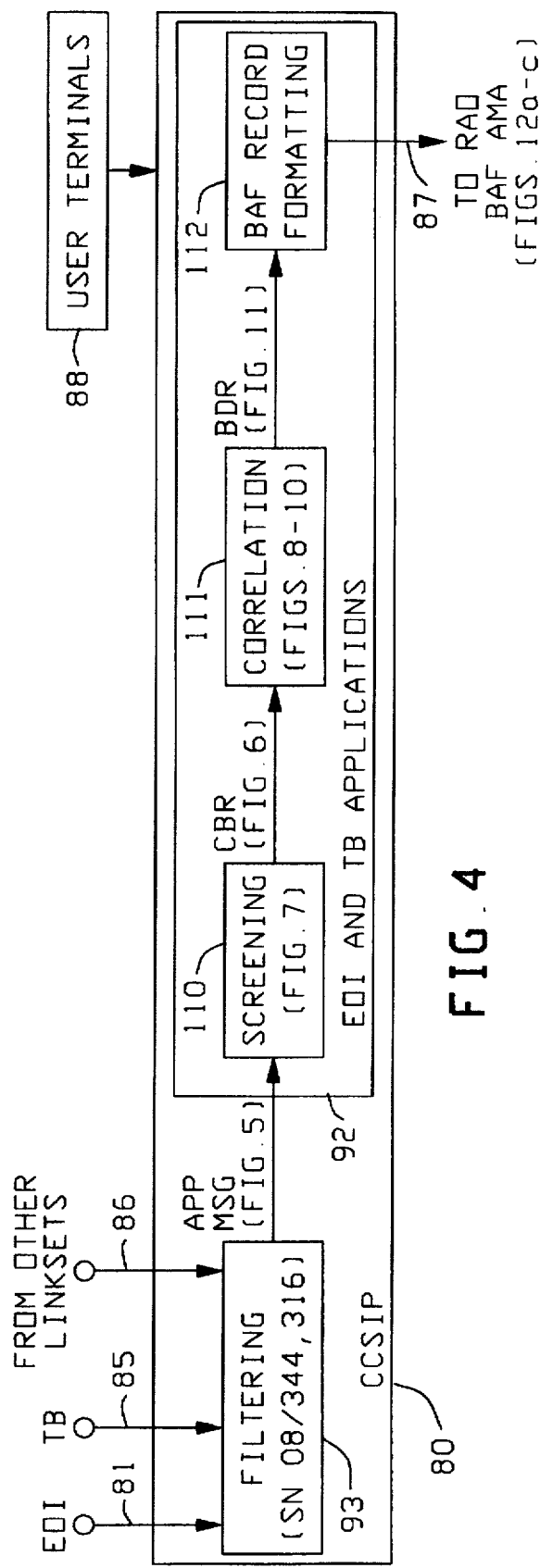

APPLICATION MESSAGE

| TYPE | FIELD | DESCRIPTION | |
|---|---|---|---|
| BUFDAT | HEADER | HEADER FOR MESSAGE | 95 |
| CHARACTER | MSG CAT | MESSAGE CATEGORY | 96 |
| CHARACTER | MSG TYPE | MESSAGE TYPE | 97 |
| INTEGER | NUM OCTETS | NUMBER OF OCTETS IN THE MSU | 98 |
| INTEGER | SLS INDEX | SIGNALING LINKSET INDEX | 99 |
| CHARACTER | DIRECTION | 1=SENT 2=RECEIVED (BY STP) | 100 |
| INTEGER | TIMESTAMP | TIMESTAMP OF MESSAGE (MILLISECONDS SINCE MIDNIGHT) | 101 |
| INTEGER | DATE | SECONDS SINCE MIDNIGHT JANUARY 1,1970 GMT | 102 |
| CHARACTER | DATA | SIO AND SIF OF SS7 MESSAGE | 103 |

FIG. 5

CALL BILLING RECORD (CBR)

| TYPE | FIELD | DESCRIPTION | |
|---|---|---|---|
| BUFDAT | HEADER | HEADER FOR MESSAGE | ← 130 |
| CHARACTER | MSG TYPE | RECEIVED MESSAGE TYPE<br>IAM  ANM<br>ACM  RSC<br>EXM  REL | ← 131 |
| CHARACTER | DIRECTION | SENT OR RECEIVED BY STP<br>1=SENT<br>2=RECEIVED | ← 132 |
| INTEGER | TIMESTAMP | MILLISECONDS SINCE MIDNIGHT | ← 133 |
| INTEGER | DATE | SECONDS SINCE MIDNIGHT JANUARY 1,1970 GMT | ← 134 |
| INTEGER | POINT CODE 1 | PRIMARY OPC OR DPC | ← 135 |
| INTEGER | POINT CODE 2 | SECONDARY OPC OR DPC | ← 136 |
| INTEGER | SLSID | SLS INDEX | ← 137 |
| INTEGER | CIC | CIRCUIT IDENTIFICATION CODE | ← 138 |
| CHARACTER | TRUNK GROUP | TRUNK GROUP NUMBER (FROM EXM) | ← 139 |
| CHARACTER | ONA | ORIGINATING NETWORK ADDRESS | ← 140 |
| CHARACTER | INTERNATIONAL | INTERNATIONAL INDICATOR<br>1=INTERNATIONAL | ← 141 |
| CHARACTER | CARRIER ID | CARRIER ID FROM TNS OR CIP | ← 142 |
| CHARACTER | TNA | TERMINATING NETWORK ADDRESS | ← 143 |
| CHARACTER | CALL TYPE | CALL TYPE<br>1=ACCESS<br>2=CONVERSATION | ← 144 |

FIG. 6

CALL DATA KEY STRUCTURE

| TYPE | FIELD | DESCRIPTION | SOURCE | |
|---|---|---|---|---|
| INTEGER | CIC(KEY) | CIRCUIT IDENTIFICATION CODE | CRB FOR ALL MSGS | ← 160 |
| INTEGER | POINT CODE1(KEY) | PRIMARY POINT CODE FOR CALL | CRB FOR ALL MSGS | ← 161 |
| INTEGER | POINT CODE2(KEY) | SECONDARY POINT CODE FOR CALL | CRB FOR ALL MSGS | ← 162 |
| KEY NODE POINTER | PARENT | POINTER TO PARENT KEY NODE | | ← 163 |
| CHARACTER | USED | USED/UNUSED MARKER | | ← 164 |
| KEY NODE POINTER | BRANCH | POINTER TO KEY VALUES GREATER THAN KEY BUT LESS THAN NEXT KEY | | ← 165 |
| DATA NODE POINTER | DATA | POINTER TO CALL DATA (FIG.10) | | ← 166 |

CALL DATA STRUCTURE

| TYPE | FIELD | DESCRIPTION | SOURCE | |
|---|---|---|---|---|
| CHARACTER | CALL TYPE | CALL TYPE 1=ACCESS 2=CONVERSATION | CBR FOR IAM | 170 |
| INTEGER | IAM DATE TIME | TIME/DATE FOR IAM(SECS SINCE MIDNIGHT JAN 1, 1970 GMT) | CBR FOR IAM | 171 |
| INTEGER | IAM TIMESTAMP | MILLISECOND TIME IN IAM | CBR FOR IAM | 172 |
| INTEGER | EXM DATE TIME | EXM MSG TIME/DATE | CBR FOR EXM | 173 |
| INTEGER | EXM TIMESTAMP | MILLISECOND TIME IN EXM | CBR FOR EXM | 174 |
| INTEGER | ACM DATE TIME | ACM MSG TIME/DATE | CBR FOR ACM | 175 |
| INTEGER | ACM TIMESTAMP | MILLISECOND TIME IN ACM | CBR FOR ACM | 176 |
| INTEGER | ANM DATE TIME | ANM MSG TIME/DATE | CBR FOR ANM | 177 |
| INTEGER | ANM TIMESTAMP | MILLISECOND TIME IN ANM | CBR FOR ANM | 178 |
| INTEGER | REL DATE TIME | RSC OR REL MSG TIME/DATE | CBR FOR RSC/REL | 179 |
| INTEGER | REL TIMESTAMP | MILLISECOND TIME IN RSC OR REL | CBR FOR REL MSG | 180 |
| CHARACTER | CARRIER ID | CARRIER ID | CBR FOR IAM | 181 |
| CHARACTER | TRUNK GROUP | TRUNK GROUP NUMBER | CBR FOR EXM | 182 |
| CHARACTER | ONA | ORIGINATING NUMBER | CBR FOR IAM | 183 |
| CHARACTER | TNA | TERMINATING NUMBER | CBR FOR IAM | 184 |
| CHARACTER | INTERNATIONAL | INTERNATIONAL INDICATOR | CBR FOR IAM | 185 |

| | | | |
|---|---|---|---|
| CHARACTER | USED | USED/UNUSED MARKER | |
| CHARACTER | IAM FILLED | IAM FILLED INDICATOR | SET WHEN IAM IS RECEIVED |
| CHARACTER | EXM FILLED | EXM FILLED INDICATOR | SET WHEN EXM IS RECEIVED |
| CHARACTER | ACM FILLED | ACM FILLED INDICATOR | SET WHEN ACM IS RECEIVED |
| CHARACTER | ANM FILLED | ANM FILLED INDICATOR | SET WHEN ANM IS RECEIVED |
| CHARACTER | REL FILLED | REL FILLED INDICATOR | SET WHEN RSC/REL IS RECEIVED |
| INTEGER | SLS ID | THE SLS INDEX | CBR FOR IAM |
| CHARACTER | GUARD IND | GUARD INDICATOR | SET WHEN INCOMPLETE BILLING RECORD IS WRITTEN |
| CHARACTER | LONG DURATION | LONG DURATION INDICATOR | SET BY LONG DURATION FUNCTION |

FIG. 10B

| FIG. 10A |
|---|
| FIG. 10B |

FIG. 10

BILLING DATA RECORD (BDR)

| TYPE | FIELD | DESCRIPTION | |
|---|---|---|---|
| CHARACTER | REC TYPE | BILLING REC IND | 225 |
| INTEGER | CAP POINT CODE | POINT CODE OF THE UNIT OUTSIDE LEC NETWORK | 226 |
| INTEGER | LEC POINT CODE | POINT CODE OF LEC NETWORK UNIT | 227 |
| CHARACTER | CALL CODE | 1=CALL CODE 883<br>2=CALL CODE 884 | 228 |
| CHARACTER | CURRENT TIME TENTHS | TENTHS OF A SECOND TO ADD TO CURRENT TIME AND DATE | 229 |
| INTEGER | CURRENT DATE TIME | CURRENT DATE AND TIME IN SECONDS SINCE MIDNIGHT JANUARY 1,1970 GMT | 230 |
| CHARACTER | CARRIER ID | IEC/INC | 231 |
| CHARACTER | ORIG NUMBER | ORIGINATING NUMBER | 232 |
| CHARACTER | TERM NUMBER | TERMINATING NUMBER | 233 |
| INTEGER | CIC | CIRCUIT IDENTIFICATION CODE | 234 |
| INTEGER | SLS ID | SIGNALING LINK SET INDEX | 235 |
| CHARACTER | TRUNK GROUP | TRUNK GROUP NUMBER | 236 |
| CHARACTER | INTERNATIONAL | INTERNATIONAL INDICATOR | 237 |
| INTEGER | ELAPSED TIME | ELAPSED TIME OF CALL IN TENTH SECONDS | 238 |
| INTEGER | CONNECT DATE TIME | CONNECT DATE AND TIME IN SECONDS SINCE MIDNIGHT JANUARY 1,1970 GMT | 239 |
| CHARACTER | CONNECT TIME TENTHS | TENTHS OF A SECOND TO ADD TO CONNECT TIME AND DATE | 240 |
| CHARACTER | GUARD IND | TIMING INDICATOR TIMING GUARD INDICATOR | 241 |
| CHARACTER | LONG DURATION | TIMING INDICATOR LONG DURATION INDICATOR | 242 |

FIG. 11

STRUCTURE CODE 8010-AMA FORMAT FOR SS7
DERIVED TANDEM AMA

| INFORMATION | TABLE NUMBER | |
|---|---|---|
| RECORD DESCRIPTOR WORD | 000 | — 250 |
| RECORD IDENTIFIER | 00 | — 251 |
| STRUCTURE CODE | 0 | — 252 |
| CALL CODE | 1 | — 253 |
| LINKSET ID | 441 | — 254 |
| RECORDING OFFICE IDENTIFICATION | 5 | — 255 |
| DATE OF ANSWER | 6 | — 256 |
| TIMING INDICATOR | 7 | — 266 |
| ANSWER INDICATOR | 9 | — 257 |
| ORIGINATING NPA | 13 | — 258 |
| ORIGINATING NUMBER | 14 | — 259 |
| OVERSEAS INDICATOR | 15 | — 260 |
| TERMINATING NUMBER | NONE | — 261 |
| CONNECT TIME | 18 | — 262 |
| ELAPSED TIME | 19 | — 263 |
| IEC/INC PREFIX | 57 | — 264 |
| TRUNK GROUP NUMBER | 83 | — 265 |

FIG. 12a

MODULE CODE 22-LONG DURATION CONNECTION MODULE

| INFORMATION | TABLE NUMBER | |
|---|---|---|
| MODULE CODE | 88 | 270 |
| PRESENT DATE | 6 | 271 |
| PRESENT TIME | 18 | 272 |

FIG. 12b

MODULE CODE 104-TRUNK IDENTIFICATION MODULE

| INFORMATION | TABLE NUMBER | |
|---|---|---|
| MODULE CODE | 88 | 280 |
| TRUNK IDENTIFICATION | 244 | 281 |

FIG. 12c

APPARATUS AND METHOD FOR GENERATING CALL DURATION BILLING RECORDS UTILIZING ISUP MESSAGES IN THE CCS/SS7 TELECOMMUNICATIONS NETWORK

CROSS REFERENCE TO RELATED APPLICATIONS—1

This is a nonprovisional application corresponding to and claiming the benefit of copending provisional application Ser. No. 60/009,129, filed on Dec. 22, 1995.

CROSS REFERENCE TO RELATED APPLICATIONS—2

The present invention is particularly suitable for use in the system disclosed in co-pending U.S. patent applications Ser. No. 08/344,316 filed Nov. 22, 1994, entitled "Common Channel Signaling Network Applications Platform", (now U.S. Pat. No. 5,579,371 issued Nov. 26, 1996); Ser. No. 08/358,221 filed Dec. 16, 1994, entitled "Interprocess Communication Apparatus For A System Of Networked Computers"; Ser. No. 08/367,497 filed Dec. 30, 1994, entitled "Apparatus And Method For Providing User-Controlled Management Of A Common Channel Signaling Information Platform"; and Ser. No. 08/367,965 filed Dec. 30, 1994, entitled "Apparatus And Method For Extracting And Processing Data Derived From A Common Channel Signaling Network With High Reliability". Said U.S. patent applications Ser. No. 08/344,316; Ser. No. 08/358,221; Ser. No. 08/367,497 and Ser. No. 08/367,965 are incorporated by reference herein in their entirety and are collectively denoted herein as the Common Channel Signaling Information Platform (CCSIP) SNs.

BACKGROUND OF THE INVENTION

1. Field of the Invention

The invention relates to the telecommunications Common Channel Signaling (CCS) network particularly with respect to generating call duration billing records for calls initiated and terminated therethrough.

2. Description of the Prior Art

Telephone systems presently include a CCS network overlay on the conventional Public Switched Telephone Network (PSTN). The CCS network is implemented utilizing the Signaling System No. 7 (SS7) protocol and is often referred to as the Common Channel Signaling System No. 7 (CCS/SS7) network.

The PSTN in the United States is largely comprised of the networks of the Regional Bell Operating Companies (RBOC) and the networks of the long distance Interexchange Carriers (IXC). The RBOC networks are comprised of switching offices such as End Offices (EO) and Tandem Offices interconnected by voice/data trunks. The RBOCs comprised of Local Exchange Carriers (LEC) provide local service. The Tandem switches, via voice/data trunks, provide the principal points of interconnection to the IXCs.

The CCS/SS7 network is a packet switched network that comprises nodes called Signaling Points (SP) and digital links that interconnect the SPs. The SPs include at least two basic types; namely, the Signaling Transfer Point (STP) and the Service Switching Point (SSP). The PSTN communicates with the CCS/SS7 network via the SSPs located at the telephone company switching offices such as the End Offices and Tandem Offices. The SSPs are connected to the STPs via digital links.

CCS/SS7 separates the signaling function that sets up and supervises a call from the switched voice/data path of the call through the PSTN. The CCS/SS7 network conveys data packets called SS7 Signal Units (SU) generated by the SSPs and routed by the STPs. As discussed in said Ser. No. 08/344,316, three types of SUs are specified for signaling on the CCS/SS7 network. These are denoted as Message Signal Units (MSU), Link Status Signal Units (LSSU) and Fill-In Signal Units (FISU). The MSU carries network information and is utilized to convey call setup and supervision signaling. One category of MSU is the ISUP MSU which includes an Integrated SerVice Digital Network User Part and is generally utilized to transfer the call setup and supervision signaling information. The MSU of the ISUP category can be of a variety of types. An ISUP MSU can be an Initial Address Message (IAM), an Exit Message (EXM), an Address Complete Message (ACM), an Answer Message (ANM), a Reset Circuit Message (RSC), a Release Message (REL) or a Release Complete Message (RLC). Numerous other MSU categories and MSU types are used in the SS7 protocol for performing a variety of functions.

The above-discussed ISUP MSUs are principally utilized in call and voice/data circuit setup, supervision and teardown. The MSUs are transported between the PSTN switching offices via the SSPs and STPs of the CCS/SS7 network.

The generation of Automatic Message Accounting (AMA) call duration billing records is currently the function of the End Offices and Tandem Offices of the network. For example, in a long distance telephone call, the LEC bills the IXC for access based on call duration billing records generated at the LEC switching offices. The switching offices utilize established protocols involving predetermined uses of SS7 messages and are in accordance with the well known Bellcore AMA Format (BAF). BAF records are described in Bellcore Specification TR-NWT-001100 and in the updated issue thereof GR-1100-CORE (issued Jan. 1, 1995). The switches use internal information inherent to the switch, such as time of off-hook, dialing number, selected trunk group, etc.

The Federal Communication Commission (FCC) has recently mandated that the RBOCs permit Competitive Acc. Providers (CAP) access to their networks to increase competition. Pursuant to the FCC order, the LECs are required to permit CAPs to provide tandem switching services between the LEC End Offices and the IXCs. Since the LEC utilizes the LEC Tandem switches to generate the call duration billing records for the long distance calls that originate and terminate in the LEC network, and since a CAP Tandem may instead be utilized, the billing information that had been provided in the LEC switches would now not be accurately available from the third party CAP. A similar problem arises when a CAP EO provides local service in an LEC area through LEC switches. When the EO is owned by a third party such as a CAP, the LEC switches would no longer have the information required to accurately generate the bills. The LEC may even be precluded completely from recording certain calls.

For certain call flow scenarios involving CAP switches, the LEC would be prevented from generating an accurate billing record. When such a bill is encountered by the Revenue Accounting Office (RAO) of the RBOC, either the bill will be denoted as invalid, or inaccurate information in the bill may result in the wrong telephone company being invoiced.

One solution to the problem would be for the CCS/SS7 billing record generation protocols to be modified and for the switches in the network to be accordingly reconfigured. Considering the present day multi-vendor switch environment in the telecommunications network switching fabric, this solution would be inordinately expensive and would require an excessive amount of time to accomplish.

Specifically, the telephone company switches are presently programmed to generate the AMA call duration billing records in accordance with an established SS7 environment protocol. With CAP EO and CAP Tandem Office switches interposed in the RBOC networks, the RBOCs would be prevented from preparing accurate call duration bills utilizing the established protocols. Reconfiguration of the RBOC switch software to accommodate the FCC requirements would take approximately five years and cost tens of millions of dollars. The FCC, however, is currently requiring that the third party providers be given access to the RBOC networks.

Systems are known in the prior art that couple to the CCS/SS7 network for performing specific dedicated tasks unrelated to call duration billing. For example, an article in *TELECOMMUNICATIONS* of July 1987, volume 21 No. 7, pages 67–71, entitled "SS7 Testing Tools" by B. Nelson, describes equipment for testing the CCS/SS7 network. The equipment can record information at a network point and perform limited analysis thereon.

Another dedicated system is disclosed in U.S. Pat. No. 4,788,718 issued Nov. 29, 1988, entitled "Call Data Collection And Modification Of Received Call Distribution". The disclosed system collects call data from an STP link and processes the call data to perform traffic analysis.

Another such dedicated system is disclosed in U.S. Pat. No. 5,008,929 issued Apr. 16, 1991, entitled "Billing System For Telephone Signaling Network". The system of said U.S. Pat. No. 5,008,929 captures MSUs received by an STP and processes the MSUs to identify, as a service provider, a telephone company that transports an MSU, or a telephone company that provides call data for an MSU, for example, in response to an MSU query. The MSUs are also processed to identify, as a recipient for this service, the telephone company that formulated the MSU.

SUMMARY OF THE INVENTION

In the present invention, the above-described disadvantages of the prior art are obviated without reconfiguring the software and switches of the PSTN and CCS/SS7 networks. In the preferred embodiment of the invention, the platform described in said CCSIP SNs is utilized. It is appreciated, however, that other platforms may be utilized in embodying the invention.

The invention comprises filtering SUs copied from the CCS/SS7 network for the ISUP MSUs utilized in setting up and controlling a call and, based on information in the ISUP MSUs together with the times of arrival of the MSUs, determining the time duration of the call and providing data that can be utilized to determine the appropriate entity to bill for the elapsed time of the call. Specifically, an IAM that sets up a call is correlated with subsequent ISUP MSUs for the call. The information in the IAM and correlated subsequent MSUs, together with the times of arrival, provide the elapsed time for the call and the data for identifying the appropriate entity to bill and are utilized to generate a billing record for the call. The subsequent correlated ISUP MSUs utilized to determine the start of timing may be either the ACM or ANM message. Alternatively, the EXM message may be utilized to begin timing. As a further alternative, timing can begin with the time of receipt of the IAM plus a settable predetermined time interval.

Preferably, the correlated ISUP MSUs utilized to determine call completion time are either the RSC or the REL message. The RLC may also be utilized in determining call termination.

In the preferred embodiment of the invention, the MSUs are copied on digital links between an LEC STP and a CAP switch, such as a CAP EO or a CAP Tandem.

BRIEF DESCRIPTION OF THE DRAWINGS

FIG. 1 is a schematic illustration of the ISUP MSUs showing the fields utilized in implementing the present invention.

FIG. 4 is a schematic block diagram illustrating details of the CCSIP of FIG. 3.

FIG. 5 is a data structure diagram of the Application Message described in said Ser. No. 08/344,316. The Application Message is passed by the filtering component of FIG. 4 to the applications on the CCSIP.

FIG. 6 is a data structure diagram schematically illustrating the Call Billing Record (CBR) transmitted by the screening component of FIG. 4.

FIGS. 9 and 10 are data structure diagrams schematically illustrating the Call Data Key Structure and the Call Data Structure, respectively, utilized by the correlation component of FIG. 8.

FIG. 11 is a data structure diagram schematically illustrating the Billing Data Record (BDR) built by the correlation component of FIG. 8.

FIGS. 12a, 12b and 12c are data structure diagrams schematically illustrating BAF records generated by the BAF record formatting component of FIG. 4. The BAF records are transmitted by the CCSIP of FIG. 4 to the Revenue Accounting Office (RAO) of the telephone company deploying the CCSIP.

DESCRIPTION OF THE PREFERRED EMBODIMENTS

Figure 2:
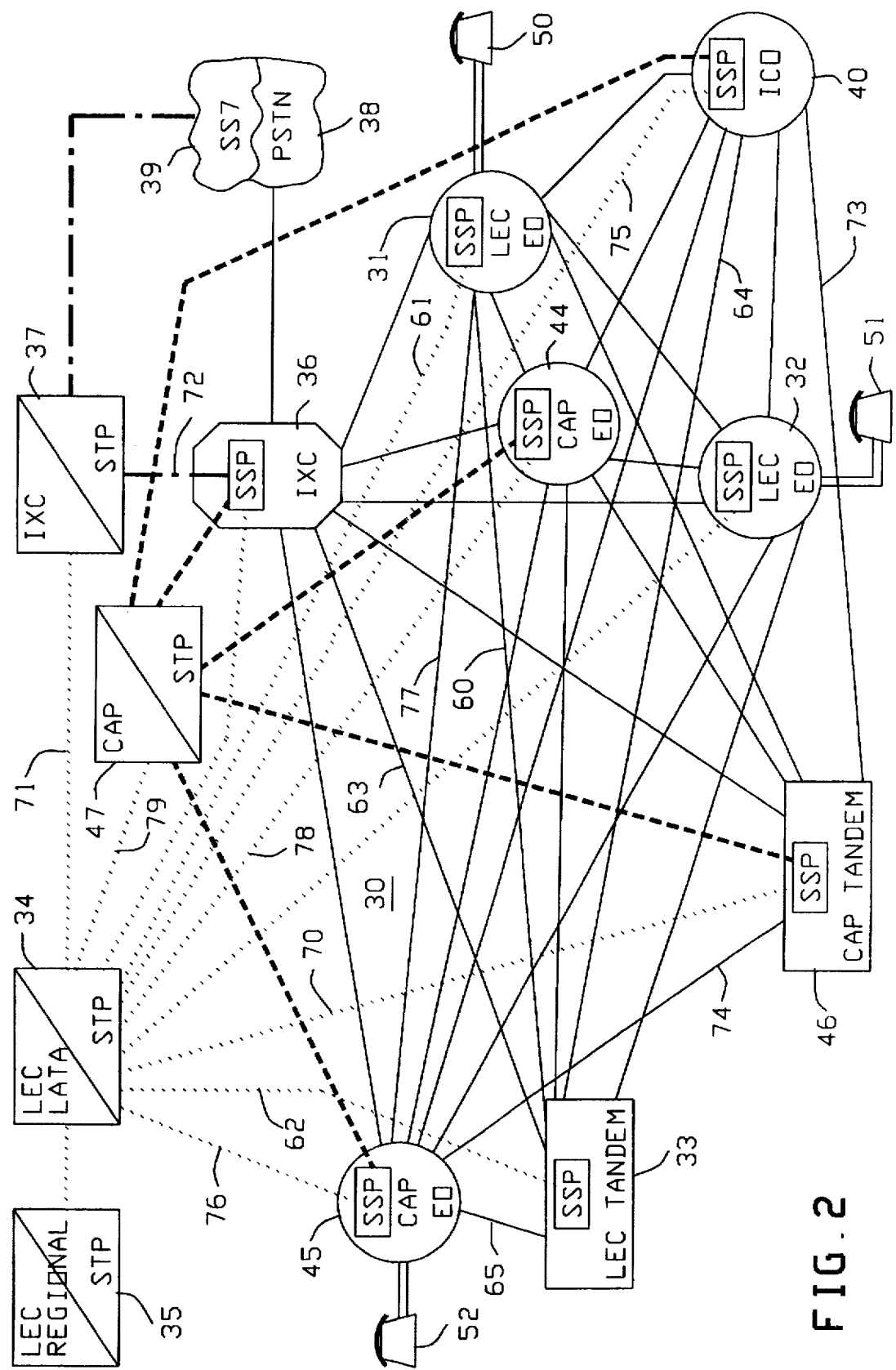
FIG. 2 is a schematic diagram of the PSTN with the CCS/SS7 overlay and with CAP switches connected for access therewith.

Referring to FIG. 1, a schematic representation 10 of the ISUP MSU is illustrated. The standard SU formats are provided in Bellcore Publication TR-NWT-000246, Issue 2, June 1991, Revision 3, December 1993. The SU representation 10 illustrates the ISUP MSU fields of particular interest in practicing the present invention.

The SU 10 includes a Length Indicator (LI) field 11 that is utilized to differentiate the MSU type of SU from the FISU and LSSU types. As described in said Ser. No. 08/344,316, the MSU has an LI greater than two, whereas the FISU and LSSU have LIs of two or less.

The SU 10 includes a Service Information Octet (SIO) 12 which includes a Service Indicator (SI) 13. The SI 13 identifies the message category of the MSU (ISUP, SCCP, etc.). The SI field 13 is used to distinguish the ISUP MSU from other categories of MSU for use in the present invention.

The SU 10 further includes a Signaling Information Field (SIF) 14 which includes a Routing Label 15. The remainder of the SIF 14 includes user information that may be circuit-related, as well as information identifying the message type within the message category.

The Routing Label 15 includes a Destination Point Code (DPC) field 16, an Originating Point Code (OPC) field 17, and a Signaling Linkset Selection (SLS) field 18. The DPC field 16 indicates the signaling point for which the message is intended, while the OPC field 17 indicates the signaling point which is the source of a message. The SLS field 18 is used by the signaling system to balance Signal Unit routing for load sharing. The SIF 14 includes a Circuit Identification Code (CIC) field 19. The CIC field 19 indicates one voice or data circuit among those directly interconnecting the DPC and the OPC. It is appreciated that the OPC, DPC and CIC combination uniquely identifies the voice/data circuit that an SS7 message is controlling.

The SIF 14 further includes a Type field 20. The Type field 20 contains an identification of the message type within the message category. For example when the SI field 12 indicates the message category ISUP, the Type field 20 can indicate that the ISUP message is of type IAM, EXM, ACM, ANM, RSC, REL, or RLC.

If the SU 10 is an MSU of category ISUP and type IAM, the SIF 14 may contain a Carrier Identification Parameter (CIP) field 21 or a Transit Network Selection (TNS) field 22. The presence of a CIP or a TNS in the respective fields 21 and 22 indicates that the IAM message is destined for an IXC.

If the SU 10 is an ISUP MSU of message type IAM, the SIF 14 may contain either or both of a Calling Number field 23a and a Charge Number field 23b and will contain a Called Number field 24 for containing respective calling, charge and called telephone numbers.

If the SU 10 is an ISUP MSU of message type EXM, the SIF 14 will contain a Trunk Group Number field 25. The EXM is the ISUP Exit message and is sent in the backward direction from an Access Tandem to the End Office indicating that call setup information has successfully proceeded to the adjacent IXC network. The field 25 indicates the outgoing trunk group from the Access Tandem to the IXC.

The above described MSU fields of FIG. 1 are those of particular interest in practicing the invention. The MSUs contain further fields (not shown in FIG. 1) that may be used in constructing a product application program embodiment for the platform described in said CCSIP SNs. Such fields are the Originating Line Information Parameter (OLIP) field, the Carrier Selection Information (CSI) field and the Cause Indicator field. It is appreciated that the OLIP and CSI fields are in the IAM, whereas the Cause Indicator field is in the REL message. The Cause Indicator field may contain a cause value. Length information for the Calling Number, Charge Number, Called Number and Trunk Group Number may also be included in the associated MSUs. All of the above discussed MSU fields and information are described in said TR-NWT-000246 and will be further discussed below.

Referring to FIG. 2, a schematic representation of a telephone network 30 servicing a LATA is illustrated. The LATA is serviced by an RBOC via a Local Exchange Carrier (LEC). The LEC services the area through End Office (EO) switching offices 31 and 32 and an LEC Tandem switching office 33. The LEC switching offices 31–33 are interconnected by interoffice trunks as illustrated. In FIG. 2, interoffice trunks are represented as solid lines. Herein, solid lines comprise one or more trunks or trunk groups.

The LEC network is serviced by a CCS/SS7 network including SSPs in the LEC switching offices 31, 32 and 33, a LATA STP 34 and a Regional STP 35. The LEC CCS/SS7 network is interconnected by LEC signaling linksets as illustrated. In FIG. 2, LEC signaling linksets are represented by dotted lines. Herein, linksets can comprise one or more links or sets of links.

Long distance service is provided in the LATA by an IXC switching office 36. The IXC 36 communicates with the CCS/SS7 network via an SSP included in the switching office 36 and an IXC STP 37. The IXC CCS communication is effected over signaling linksets represented in FIG. 2 by dot-dash lines. The IXC STP 37 communicates with the LEC STP 34 via the LEC signaling links 71. Access by the LEC switching offices 31, 32 and 33 to the IXC 36 is via the interoffice trunks (solid line) illustrated.

The IXC 36 communicates with the PSTN 38 via the interoffice trunk facilities illustrated and the IXC STP 37 communicates with the CCS network 39 via the signaling linksets illustrated. The IXC 36 communicates with the LEC CCS network via the LEC LATA STP 34 through the SSP in the switching office 36 and the IXC STP 37. The communication is via the signaling linksets 71 and 72.

A switching office 40 of an Independent Telephone Company (ICO) is illustrated in the network 30. The ICO office 40 is connected to the LEC switching offices 31, 32 and 33 by the interoffice trunks illustrated. The ICO 40 accesses the LEC CCS/SS7 network at the STP 34 via LEC signaling links 75 interconnecting the LEC STP 34 with the SSP in the ICO office 40.

In order to provide competition for the LEC in the LATA, a Competitive Access Provider (CAP) is introduced into the LATA to provide competitive access and switching. The CAP is illustrated as including CAP End Offices 44 and 45 and a CAP Tandem office 46. A CAP STP 47 provides CCS/SS7 access and switching for the CAP offices 44–46. The CAP switching offices 44–46 are illustrated interconnected with respect to each other by interoffice trunks (solid line) in a manner similar to that described above with respect to the LEC offices 31–33. The CAP switching offices 44–46 are connected to the CAP STP 47 by CAP signaling links as illustrated. In FIG. 2, CAP signaling links are represented by dashed lines.

For illustrative purposes, subscriber telephones 50 and 51 are shown connected to the LEC End Offices 31 and 32, respectively, via the loops illustrated. A telephone 52 is also shown connected to the CAP End Office 45 via a loop. In FIG. 2, loops are represented by double solid lines.

The LEC network is connected and the LEC switches are configured in accordance with predetermined AMA protocols so that the LEC switches provide appropriate billing records. Call information entered at an originating LEC switch, together with call setup and tear-down ISUP messages, are utilized by the LEC switches in accordance with the predetermined protocols to construct the billing records. For example, if a long distance call is originated from the telephone 50 utilizing IXC 36 as the long distance carrier, the LEC EO 31 establishes a billing record entering such originating call data as time of off-hook, calling number, called number, etc. The SSP in the LEC EO 31 formulates an IAM message destined for the LEC Tandem 33. The IAM designates a circuit in LEC interoffice trunk group 60. The IAM is transported from the LEC EO 31 to the LEC Tandem 33 through the LEC STP 34 over LEC signaling links 61 and 62. The LEC Tandem 33, in turn, forwards the IAM to the IXC 36 through the LEC STP 34 selecting LEC trunk group 63 for the voice circuit for the call path between the LEC Tandem 33 and the IXC 36. The LEC Tandem 33 sends an EXM message back to the LEC EO 31 designating the Trunk Group Number of the selected trunk group 63. The LEC EO 31 uses this Trunk Group Number to identify the IXC 36 for the purposes of billing the long distance carrier for access to the LEC trunks and switches.

In a similar manner, a call originating at the LEC EO 31 and terminating at the ICO 40 through the LEC Tandem 33 results in a Trunk Group Number for LEC trunk 64 being provided to the LEC EO 31 for use in the billing records. Similarly, calls that complete from the LEC EO 31 to the CAP EO 45 through the LEC Tandem 33, result in LEC trunk group 65 being identified for billing purposes.

In a similar manner, calls completed to the LEC EO 31 from the IXC 36, the ICO 40, and the CAP EO 45 through the LEC Tandem 33, result in Trunk Group Numbers for the LEC trunks 63, 64 and 65, respectively, being provided to the LEC for the appropriate LEC access and switching billing.

Local calls may also be placed between the telephones 50 and 51 either directly through the LEC End Offices 31 and 32 or through the LEC Tandem 33. The call circuit is controlled by ISUP messages through the LEC STP 34 and the illustrated interconnecting LEC signaling links (dotted line). Since the call only involves LEC switches, LEC interoffice trunks and LEC CCS/SS7 signaling links, no access switching or transport billing involving another telephone company is involved.

As discussed above, the CAP switching offices 44-46 are included in the LATA to provide competition to the LEC. Accordingly, the CAP switching offices 44-46 are provided with access to the LEC switching offices 31-33 via the interoffice trunks (solid line) as illustrated. The CAP switching offices 44-46 are also provided with access to the LEC CCS/SS7 network at the LEC STP 34 via the LEC signaling links 78, 76, and 70, respectively. Alternatively, access may be provided to the LEC STP 34 via the CAP STP 47 and the LEC signaling links 79 connected therebetween. The CAP EOs 44 and 45 may be provided by an Alternate Exchange Carrier (AEC) and the CAP Tandem 46 provided by a Tandem Service Provider (TSP).

When the CAP switching offices 44-46 are given access to the LEC network, the AMA billing protocols of the LEC switching offices 31-33 may generate inappropriate billing records and may fail to generate billing records appropriate to the Competitive Access Providers. For example, if in the above described call flow scenarios, a CAP Tandem is utilized instead of a LEC Tandem, inappropriate Trunk Group Numbers may be provided to the billing system resulting in invalid billing records or the wrong telephone company being invoiced. If a CAP EO is utilized instead of a LEC EO, appropriate access, switching or transport billing records may not be generated.

Figure 3:
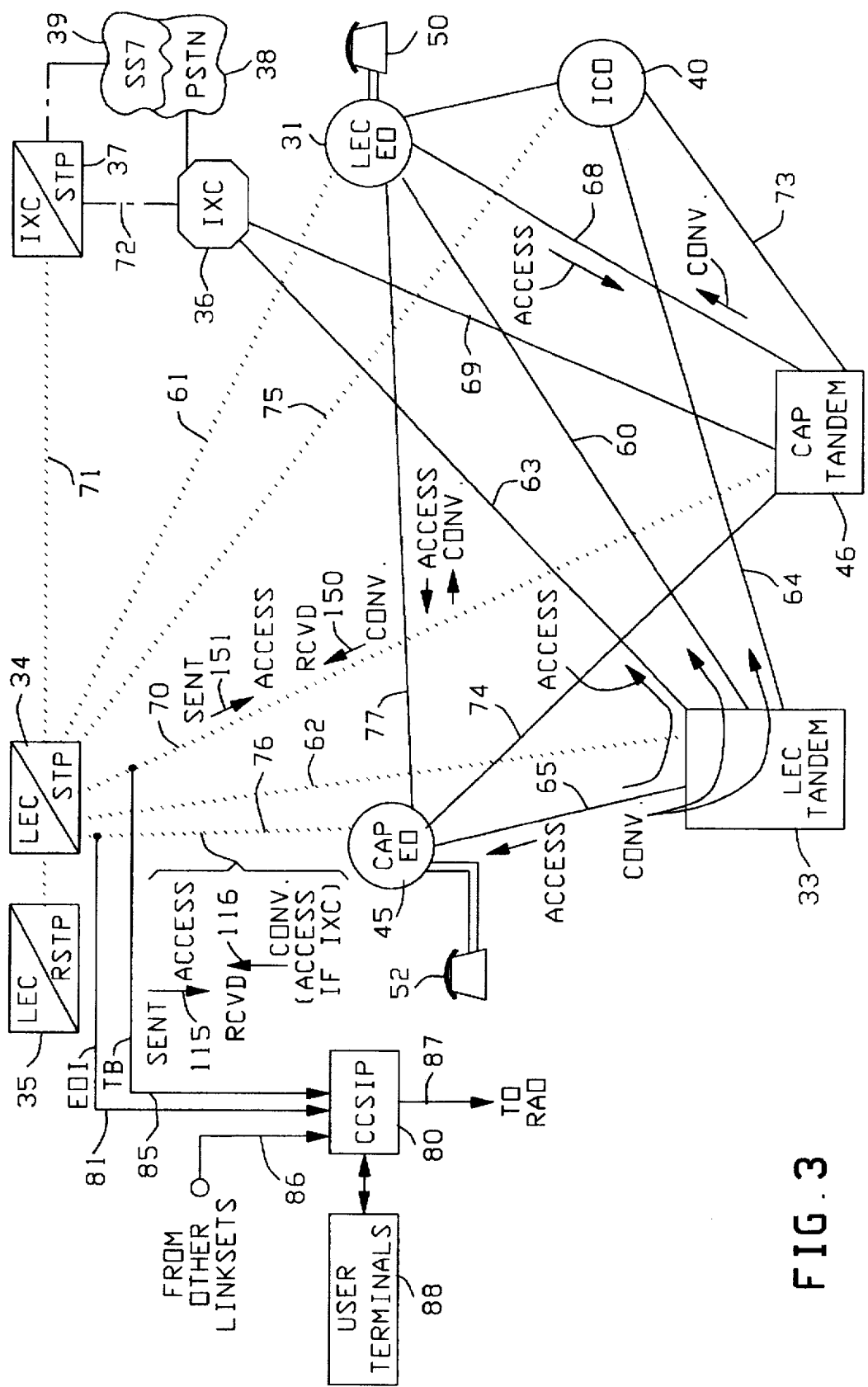
FIG. 3 is a schematic diagram of a portion of FIG. 2 with the CCSIP connected to selected links for practicing the present invention.

Referring to FIG. 3, in which like reference numerals indicate like elements with respect to FIG. 2, a portion of the network 30 of FIG. 2 is separately illustrated. The SSPs of FIG. 2 are also not shown in FIG. 3 for clarity. In the call flow scenarios discussed above, the CAP Tandem 46 is considered as providing tandem services in the LEC network instead of the LEC Tandem 33 as described. In the above described long distance telephone call from the telephone 50, the call is now extended through the CAP Tandem 46 to the IXC 36 utilizing LEC interoffice trunks 68 and CAP interoffice trunks 69. The ISUP call setup messages transmitted between the LEC EO 31 and the CAP Tandem 46 are transported through the LEC STP 34 via LEC signaling links 61 and 70. The call setup ISUP messages conveyed between CAP Tandem 46 and IXC 36 are transported through the LEC STP 34 and the IXC STP 37 via LEC signaling links 70 and 71 and IXC signaling links 72. The EXM ISUP message conveyed by the CAP Tandem 46 to the LEC EO 31 indicates the Trunk Group Number of the CAP interoffice trunks 69. This Trunk Group Number is utilized by the LEC EO 31 in generating a billing record for the LEC access by the IXC 36. The billing record is sent to the LEC Revenue Accounting Office (RAO) for processing. Although the Trunk Group Number of the CAP trunks 69 is in the CAP data base, it is not in the LEC data base and the LEC RAO will mark the record invalid or bill the wrong telephone company if the Trunk Group Number is the same as that of a LEC trunk group extending to a telephone company not involved in the call.

Similar problems exist for calls that originate at the LEC EO 31 and complete through the CAP Tandem 46 to the ICO 40 or the CAP EO 45. CAP interoffice trunks 73 connect the CAP Tandem 46 with the ICO 40 and CAP interoffice trunks 74 connect the CAP Tandem 46 with the CAP EO 45. The ISUP call setup messages transported between the CAP Tandem 46 and the ICO 40 for controlling the voice circuit on the CAP trunks 73 are switched through the LEC STP 34 via LEC signaling links 70 and 75. The ISUP call setup messages transported between the CAP Tandem 46 and the CAP EO 45 for controlling the voice circuit on the CAP trunks 74 are switched through the LEC STP 34 via LEC signaling links 70 and 76. Again, the Trunk Group Numbers of the CAP trunks 73 and 74 are not in the LEC data base.

Similarly, anomalies can arise for calls that terminate at the LEC EO 31 through the CAP Tandem 46 from the IXC 36, the ICO 40 or the CAP EO 45.

FIG. 3 illustrates the CAP EO 45 originating and terminating calls through the LEC Tandem 33 and LEC trunks 65, as well as originating and terminating calls directly from LEC EO 31 through LEC trunks 77. ISUP call setup messages controlling the circuits on the trunks 65 are transferred between the LEC Tandem 33 and CAP EO 45 through the LEC STP 34 utilizing LEC signaling links 62 and 76. Similarly, ISUP call setup messages controlling the circuits on the trunks 77 are transported between the LEC EO 31 and the CAP EO 45 via the LEC STP 34 utilizing LEC signaling links 61 and 76.

As described above, when the CAP Tandem 46 is granted access to the LEC network to provide tandem switching, some of the LEC billing record protocols established in the LEC switches may be rendered inadequate. Similarly, when the CAP EO 45 is provided access to the LEC network for originating and terminating calls at, for example, the telephone 52 either through the LEC Tandem 33 or directly with the LEC EO 31, some of the billing record generation protocols in the LEC switches may again be rendered inadequate. For example, for local calls between the telephones 52 and 50, the LEC EO 31 may not have protocols established to appropriately bill the CAP for access or verify charges therefrom. Similarly, for calls originating or terminating at the CAP EO 45 through the LEC Tandem 33, the billing record generation protocols established in the LEC Tandem 33 may be inadequate in some scenarios. For example, in order for the LEC Tandem 33 to bill access charges to the IXC 36 for a call originating at the CAP EO 45, the LEC Tandem 33 may rely on data from the CAP EO 45 which is not necessarily received under established protocols.

As discussed, the LEC EOs and LEC Tandems are programmed to generate billing records utilized by the LEC RAO for creating invoices and performing billing verification. The established switch protocols utilize subscriber entered information as well as subscriber related data together with some of the ISUP messages to generate the billing records. As discussed above, because of the interposition of Competitive Access Provider switching offices in the LEC network, anomalous billing situations occur in certain call flow scenarios. Although the LEC switches could be reconfigured to accommodate the presence of CAPs, this solution would be inordinately expensive and time consuming to implement.

In the described embodiment of the invention, SUs copied from selected signaling linksets of the LEC SS7 network are filtered and screened for the ISUP MSUs utilized in setting up and controlling the calls in the LEC voice network. An IAM that sets up a call is correlated with subsequent ISUP MSUs for the call. The information in the IAM and correlated subsequent MSUs, together with the times of arrival of the MSUs, provide the elapsed time for the call and the data for identifying the appropriate party to bill. This information is utilized to generate a billing record for the call. Preferably, the platform described in said CCSIP SNs is coupled to the selected signaling linksets and applications on the platform provide the appropriate filtering and screening of the copied SUs, the correlation of the filtered and screened ISUP MSUs and the billing record generation. Two specific applications are implemented for determining call duration for specific respective call flow scenarios. The applications are denoted herein as End Office Integration (EOI) and Tandem Billing (TB).

The platform described in said CCSIP SNs is schematically represented by reference numeral 80. The EOI and TB applications, as deployed on the platform 80, represent two illustrative embodiments of the present invention. It is appreciated that further embodiments may be developed in practicing the invention. Since the CCSIP platform 80 with the applications deployed thereon comprise an adjunct to the CCS/SS7 and PSTN switching fabric, the copied SUs can be processed in accordance with procedures for generating appropriate and accurate billing records unlike in the switching offices of the LEC network where the billing record generation protocols are already established.

For EOI, LEC signaling links and linksets between CAP EOs and LEC STPs are monitored. One such linkset is indicated by reference numeral 76. In FIG. 2, another such linkset is indicated by reference numeral 78. The SUs copied on the linkset 76 are transported to the platform 80 on a link 81. Details of copying the SUs from an SS7 signaling linkset and transporting the copied SUs on a link, such as the link 81, to the platform 80 are described in said CCSIP SNs.

The architecture of the CCSIP 80 is described in said CCSIP SNs as link 81 comprising a T1 link coupled to TSP pairs that transmit data to Application Servers. Because of the nature of SS7 message distribution, TSPs monitoring mated STP pairs should transmit to the same Application Server. In other words, T1 circuits from mated STP pairs should be terminated at TSPs that communicate with the same Application Server. This is because call setup and tear-down messages do not necessarily transit the same linkset in both directions. Therefore, the monitored linksets for STP mated pairs should terminate at the same Application Server to accommodate bi-directional message traffic.

EOI allows LECs the ability to derive SS7 message information pertaining to calls that originate from a CAP EO and complete directly to an LEC EO, or are routed through an LEC Tandem. EOI also derives SS7 message information for calls terminating at a CAP EO from an LEC switch. The SS7 message information is then used to determine call duration in a manner to be described. In FIG. 3, the EOI call flow scenarios are exemplified by calls that originate from the CAP EO 45 and complete directly to the LEC EO 31, or are routed through the LEC Tandem 33 to, for example, the IXC 36, the LEC EO 31 or the ICO 40. Additionally, calls terminating at the CAP EO 45 directly from the LEC EO 31 or through the LEC Tandem 33 are processed under EOI. The appropriate ISUP messages are transported between these switching offices through the LEC STP 34 via the LEC signaling linksets (dotted line) as illustrated.

In TB, LEC links and linksets between LEC STPs and CAP Tandems or CAP STPs are monitored. The requirement described above with respect to EOI of monitored mated STP pairs transmitting to the same Application Server also applies to TB. The linkset 70 is illustrated as being monitored by the platform 80 via a link 85. The monitoring is performed in the manner described above with respect to the link 81. Additionally, linkset 79 of FIG. 2 may be monitored under TB.

Thus, TB permits LECs the ability to derive SS7 message information pertaining to calls that originate from an LEC EO and complete through a CAP Tandem. TB also derives SS7 message information for calls terminating at an LEC EO from a CAP Tandem. The SS7 message information is then used to determine call duration in a manner to be described.

The TB call flow scenarios illustrated in FIG. 3 include calls that originate from the LEC EO 31 and complete through the CAP Tandem 46 to the IXC 36, the ICO 40 or the CAP EO 45. TB also processes calls terminating at the LEC EO 31 through the CAP Tandem 46 from the IXC 36, the ICO 40 or the CAP EO 45. The appropriate ISUP messages are transported between these switching offices through the LEC STP 34 utilizing the LEC signaling linksets (dotted line) as illustrated.

The CCSIP 80 receives further inputs on links 86 from other selected linksets in the LEC CCS/SS7 network. For example, links 86 may couple to linksets 78 and 79 of FIG. 2.

The CCSIP 80 includes an output 87 for transmitting appropriately formatted billing records to the LEC RAO. The CCSIP 80 further comprises one or more user terminals 88 for entering SU filter data and for entering selected linksets and point codes for identifying the switches and switching offices for configuring the system to perform the EOI and TB monitoring. Entering of information via the user terminals 88 is described in said CCSIP SNs and will be further discussed below.

Referring to FIG. 4, in which like reference numerals indicate like elements with respect to FIG. 3, details of the CCSIP platform 80 with EOI and TB applications 92 are illustrated. The EOI and TB applications are similar with respect to each other and will be described together hereinbelow. Differences therebetween will be explained as appropriate.

The platform 80 includes a filtering component 93 which is described in detail in said Ser. No. 08/344,316. The copied SUs on the links 81, 85 and 86 are applied to filtering 93 which discards the FISUs and LSSUs and passes the MSUs. Filtering 93 further screens the MSUs for the ISUP category passing the ISUP MSUs of message type IAM, EXM, ACM, ANM, RSC and REL. The filtered ISUP messages of interest, along with the audit data thereof (time, date, source, direction), are passed to the applications 92 in an Application Message as illustrated in FIG. 5. The source of the message is the linkset from which the message was originally copied. As described in said Ser. No. 08/344,316, the linkset source of the message is determined from the port of the incoming platform link and from the link channel number. The linkset information is entered by the user at user terminals 88 to configure the platform 80 in accordance with the installation thereof in the user's network. The direction of the MSU on the linkset with respect to the STP is provided in accordance with the input channel number of the MSU. The time of arrival of the MSU is obtained from the time standard included in the platform 80, all as described in said Ser. No. 08/344,316.

Specifically, the filters of the filtering component 93 are downloaded from a master station utilizing user terminals 88 for applying the appropriate filtering, which is performed by linkset. The filtering component 93 only passes SUs of category ISUP and types IAM, EXM, ACM, ANM, RSC and REL to the applications 92. The filtering component 93 formats the filtered MSUs into an Application Message addressed for transmission to the applications 92, all as described in detail in said Ser. No. 08/344,316. For convenience, the Application Message is illustrated in FIG. 5.

Referring to FIG. 5, the Application Message includes fields 95–103. The fields 95–103 are explained in said Ser. No. 08/344,316 and will only be briefly described herein. Thus, the Application Message conveys the MSU category and type, index of signaling linkset from which the MSU was copied, direction of MSU on the linkset with respect to the STP, the time the MSU was copied, the date of the message, and the SIO and SIF data fields of the message.

With reference again to FIG. 4, filtering 93 provides the user with the ability to screen selected message categories and message types for entire linksets. Filtering 93 formats and forwards the Application Messages to applications 92.

The applications 92 comprise a screening component 110, a correlation component 111 and a BAF record formatting component 112. The Application Messages from the filtering component 93 are applied to the screening component 110 to screen the copied MSUs with respect to message direction, OPC and DPC in a manner to be described. The screening component 110 creates Call Billing Records (CBR) from the Application Messages and from information extracted from the filtered and screened SS7 messages. The generated CBRs are then passed to the message correlation component 111.

Thus, IAMs sent by selected End Offices and EXMs, ACMs and ANMs received by the End Offices are passed to the message correlation function 111. SS7 messages traveling in the opposite directions are also transmitted to correlation function 111. All RSCs and RELs are passed to the message correlation function 111 which screens for those that have a matching IAM. Details of the CBR data structure will be discussed with respect to FIG. 6. Details of the screening component 110 will be described with respect to FIG. 7.

The correlation component 111, in response to the CBRs from the screening component 110, correlates the EXM, ACM, ANM, RSC and REL with the corresponding IAM information for the call. The elapsed time and connect time of the call are computed from the timestamps of the correlated messages. The correlation process utilizes a searchtree database using a Call Data Key Structure and a Call Data Structure as schematically illustrated in FIGS. 9 and 10, respectively. The correlation component 111 builds a Billing Data Record (BDR) for the call containing the call data together with the elapsed and connect times.

The correlation process also contains a function to process long duration connection calls. A long duration connection call has an elapsed time of over 24 hours. The data for active calls are scanned to determine if any of them are long duration connection calls. When such a call is found, a BDR is constructed and the call information in the Call Data Structure is updated to adjust the duration time in a manner to be described. Long duration calls are often encountered in data communication situations.

The BDRs are transmitted to the BAF record formatting component 112 for generating the BAF records. Details of the correlation component 111 are described below with respect to FIGS. 8–10 and the BDR data structure is illustrated and discussed with respect to FIG. 11.

The BAF record formatting component 112 formats the AMA call data in the BDRs from the correlation component 111 into the BAF records provided on the output 87. The BAF records are generated every 24 hours at a user settable BAF Record Generation Time. A user interface entry window is provided at the terminals 88 for entry of the BAF Record Generation Time. If no entry is made, a default time of midnight is used. The BAF records contain the SS7 Derived Tandem AMA structures and modules as schematically illustrated in FIGS. 12a–12c. The BAF record formats are defined by Bellcore GR-1100-CORE and TR-NWT-001100 and will be discussed further with respect to FIGS. 12a–12c.

As described above, EOI concerns determining call duration for calls that originate from a CAP EO and complete directly to an LEC EO or are routed through an LEC Tandem. EOI is also concerned with call duration of calls terminating at a CAP EO from or through an LEC switch. TB determines call duration of calls that originate from an LEC EO and are routed through a CAP Tandem and that terminate at an LEC EO from a CAP Tandem.

For both EOI and TB, the call duration measurement is either for access time or conversation time. Calls designated for access time measurement have a Call Type or Call Code of 883. Calls designated for conversation time measurement have a Call Type or Call Code of 884. Call Type is determined based on message direction of the ISUP IAMs. In EOI, calls bound for the CAP EO and calls sent from the CAP EO that are bound for an IXC are given access time measurement treatment. Conversation time treatment is given to calls sent from the CAP EO, terminating at or through an LEC switch and not bound for an IXC. In TB, IAMs sent from the LEC EO are designated for access time measurement while IAMs bound for the LEC EO are designated for conversation time measurement. Access and conversation timing measurements may be described for both EOI and TB as follows. Access measurements are made for calls that originate in the LEC network or that transit the LEC network and are bound for an IXC. Conversation measurements are made for calls that terminate in the LEC network or transit the LEC network and are not bound for an IXC.

In both EOI and TB, timing begins with the receipt of an ACM message (ANM message if ACM is not received) for access timing records and begins with the receipt of an ANM message for conversation timing records. With respect to access timing, however, the start time for calculating access is when the tandem sends an EXM to the originating switch if it is sent before an ACM or ANM. A user-settable Exit Timer (EXIT) is included for use in adjusting access measurements in a manner to be described.

Referring again to FIG. 3, the access and conversation call directions for EOI and TB, as described above, are indicated by arrows on the interoffice trunks 65, 68 and 77. The arrows on the trunk 68 relate to TB and the arrows on the trunks 65 and 77 relate to EOI. As will be discussed further below, the Call Type of a call is determined by the direction of the IAM for the call with respect to the STP on the monitored SS7 linkset. This information is illustrated in FIG. 3 by arrows associated with the monitored linksets 70 and 76. For example, with respect to EOI, arrow 115 indicates that an IAM that has passed all EOI screening that is sent from the LEC STP 34 to the CAP EO 45 on the linkset 76 will designate a call for access time measurement. The arrow 116 indicates that an IAM that has passed all of the EOI screening that is received by the STP 34 from the CAP EO 45 on the linkset 76 designates a conversation measurement call unless the call is destined for an IXC in which case access timing is utilized.

Referring again to FIGS. 2 and 3, it is appreciated that each of the switches (STPs, EOs, Tandems and IXCs) in the network is assigned a unique point code by convention. The point codes of the switches of interest are stored in configuration tables in the platform 80 along with data as to the type of switch. For example, a point code can be identified from the configuration tables as being a CAP EO, a CAP Tandem, an LEC EO, an LEC Tandem, etc. The configuration tables also identify the linksets and links between point codes. Interoffice trunk groups and Circuit Identification Codes (CIC) between point codes are also identified in the configuration tables.

The point codes, linksets, trunk group identifications and CICs are entered by the user at user terminals 88 in accordance with the configuration of the network in which the platform 80 is utilized. The platform configuration tables and entry of user network configuration data are generally discussed in said CCSIP SNs. Thus, the user can select linksets and links to be monitored pursuant to EOI and TB and can populate the internal tables of the platform 80 with the valid trunk group numbers for CICs between switching points. The user terminals 88 provide a user interface entry window for entering the actual trunk group associated with each individual circuit between the LEC End Offices and the CAP Tandems, as well as between the CAP End Offices and the LEC switches. Specifically, the user interface entry window provides the user with the capability to associate CAP Tandems with LEC End Offices and CAP End Offices with LEC switches for which billing information is desired. The window allows the user to enter trunk group numbers associated with specific circuits between the specified CAP Tandems and LEC End Offices and between the specified CAP End Offices and LEC switches to complete the associations therebetween. The window further permits the user to select the LEC End Offices associated with the CAP Tandems and the LEC switches associated with the CAP End Offices to be monitored by the platform 80.

Thus it is appreciated that the platform 80 processes the Common Channel Signaling (CCS) messages involved with billing for use of trunks between LEC and third-party CAP equipment. The window also provides an edit field for the user to enter the Exit Timer (EXIT) value.

Figure 7:
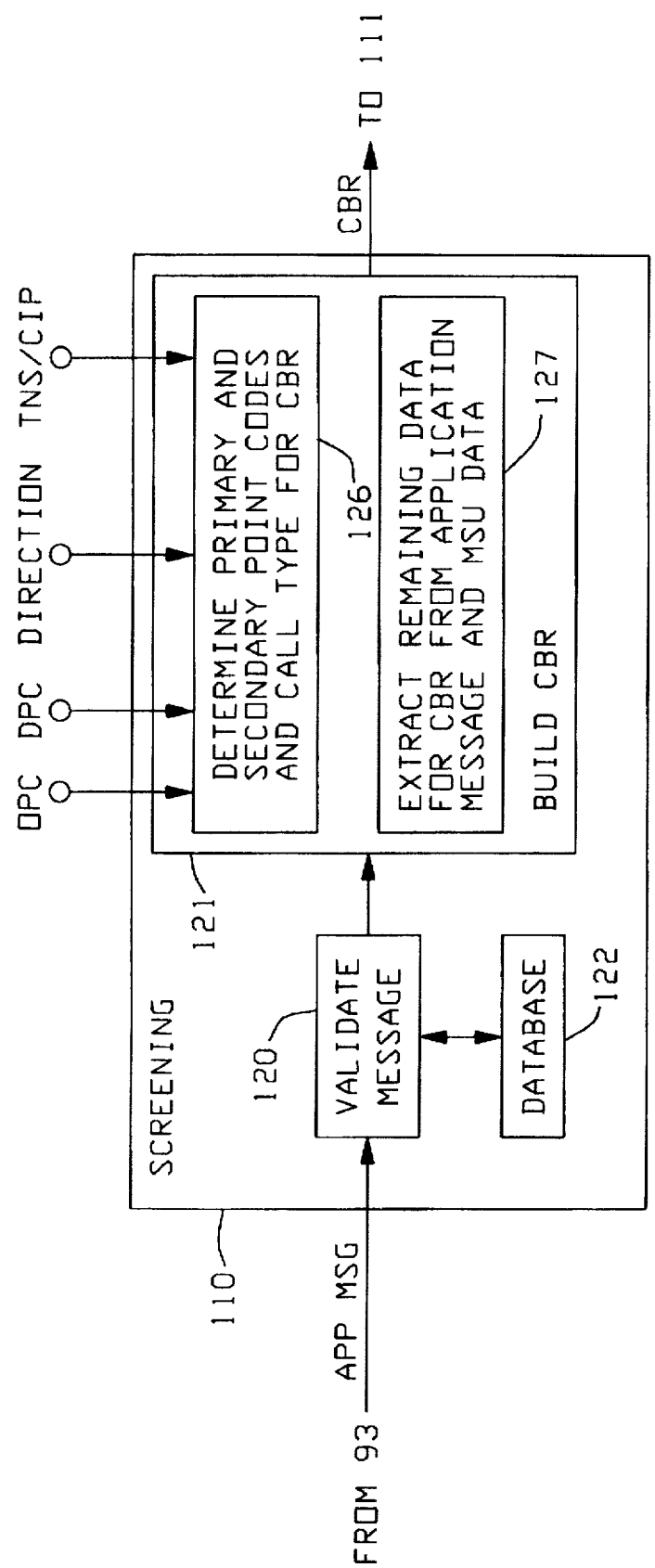
FIG. 7 is a schematic block diagram illustrating details of the screening component of FIG. 4.

Referring to FIGS. 6 and 7, FIG. 7 illustrates details of the screening component 110 and FIG. 6 schematically illustrates the data structure of the CBR generated by the screening component 110. The screening component 110 includes a validate message function 120 and a build .CBR function 121. The Application Messages (FIG. 5) from the filtering component 93 (FIG. 4) are applied to the validate message function 120 which screens for OPC/DPC and direction. The validate message function 120 validates, per SLS, each IAM message based on OPC, DPC and message direction with respect to the STP. The validation of the IAM messages is performed by matching the OPC, DPC and direction of the message to a database 122 storing the appropriate point code and direction data for valid IAM messages. The database 122 contains the valid message data for both the EOI and TB applications.

The function 120 and database 122 also validates the remaining ISUP messages (EXM, ACM, ANM, RSC and REL) passed by the filtering function 93. The validated ISUP messages are passed to the build CBR function 121. If the OPC/DPC combination is not to be processed, the invalid message is discarded.

As an example of the operation of the validate message function 120, reference is had to FIG. 3. Database 122 will contain, for the TB application with respect to the linkset 70, the point codes for the LEC EO 31 and the CAP Tandem 46 for both the sent and received directions. For EOI, the database 122 will include, with respect to the linkset 76, the point codes for the CAP EO 45 and the LEC Tandem 33 for both the sent and received directions. For a scenario where the CAP EO 45 originates or terminates a call routed through the CAP Tandem 46 to or from the IXC 36, ISUP messages on the linksets 70 and 76 with respect to the call will be discarded by the validate message function 120.

With continued reference to FIGS. 6 and 7, the build CBR function 121 constructs the CBR illustrated in FIG. 6 for each of the validated messages passed by the function 120. Build CBR 121 utilizes the Application Message data of FIG. 5, as well as the MSU data from the SIO and SIF fields of the message. Build CBR 121 includes a function 126 that determines, from the OPC, DPC, direction and TNS/CIP inputs to the function, the Primary and Secondary Point Codes and the Call Type of the message for entry into the CBR. Build CBR function 121 also includes a function 127 to extract the remaining data for the CBR from the Application Message and MSU data.

The CBR data structure, as illustrated in FIG. 6, includes fields 130–144 which are populated by the functions 126 and 127 of build CBR 121 with the information indicated in FIG. 6. Field 130 of the CBR contains an identifying header for administrative purposes. The fields 131–134 contain the message type, the message direction, the message timestamp and the message date, which are extracted from fields 97 and 100–102, respectively, of the Application Message (FIG. 5). Function 127 of build CBR 121 populates the fields 131–134 of the CBR.

Fields 135 and 136 of the CBR contain the Primary Point Code 1 and the Secondary Point Code 2, respectively. Function 126 of build CBR 121 populates these fields from the OPC and DPC of the message and from the message direction. The Primary Point Code is the OPC or DPC, based on direction. The Secondary Point Code is the opposite point code of the Primary Point Code. If direction from the STP is received, DPC is copied into the CBR as the Primary Point Code and OPC is copied as the Secondary Point Code. If the direction is sent, OPC is copied as the Primary Point Code and DPC as the Secondary Point Code. This procedure causes the Primary Point Code to always be the LEC.

Fields 137–143 of the CBR are populated by the function 127 of build CBR function 121. The SLS index of field 137 is extracted from field 99 of the Application Message (FIG. 5) and the Circuit Identification Code (CIC) of the field 138 is extracted from the MSU data (FIG. 1, field 19).

If the ISUP type is EXM, the Trunk Group Number therefrom (field 25 of FIG. 1) is extracted and copied into field 139 of the CBR. The Calling Number, or the Charge Number if Calling Number is not available, from the IAM (fields 23a and b of FIG. 1) is copied into the Originating Network Address field 140 of the CBR. The Called Number from the IAM (field 24 of FIG. 1) is copied into the Terminating Network Address field 143 of the CBR.

The function 127 examines the Called Number parameter in the IAM (field 24 of FIG. 1) to determine if the call is international. If the nature of the address field indicates international, the indication is copied into the international indicator field 141 of the CBR.

The function 127 examines IAM messages for the presence of the Transit Network Selection (TNS) or Carrier Identification Parameter (CIP) (fields 21 and 22 of FIG. 1) and if one or the other parameter is present it is copied into the Carrier ID field 142 of the CBR.

The Call Type field 144 of the CBR is populated by a designation for access timing or conversation timing by the function 126 generally utilizing the criteria discussed above. Call Type is determined from the IAM message principally in accordance with direction. For TB, IAM messages originating from the LEC are considered "outbound" or "access". A Call Type of access is indicated in the field 144 of the CBR for such calls. Under the TB application, if the message terminates at the LEC from a CAP, it is considered "inbound" or "conversation" and conversation is indicated in the Call Type field 144 of the CBR.

For EOI, a Call Type of access is given to IAMs inbound to a CAP EO from a LEC switch as well as to IAMs outbound from a CAP EO to an IXC through a LEC Tandem. Call Type of conversation is applied to IAMs outbound from a CAP EO that complete directly to a LEC EO or are routed through a LEC Tandem and are not bound for an IXC. The Call Type field 144 of the CBR is accordingly marked.

It is appreciated that fields 130–139 of the CBR are provided for the various MSU types and the CBR is extended by fields 140–144 for IAMs.

FIG. 3 graphically illustrates the process by which the function 126 (FIG. 7) determines Call Type. Arrows 115 and 116 illustrated with the linkset 76 and arrows 150 and 151 illustrated with the linkset 70 denote the determinative criteria. On a monitored linkset, if the Secondary Point Code is a CAP Tandem, IAMs with direction sent are of Call Type access whereas IAMs of direction received are of Call Type conversation. If the Secondary Point Code is a CAP EO, IAMs of direction sent have Call Type of access and IAMs of direction received have Call Type conversation unless the call is bound for an IXC. Such IXC bound calls have Call Type access. The TNS and CIP parameters are inspected to determine if the call is bound for an IXC.

The above described fields of the CBR of FIG. 6 are particularly germane to embodying the concepts of the present invention. The CBR of FIG. 6 would also include the following fields (not shown) in the above mentioned product application program embodiment of the invention. The CBR of FIG. 6 would include length fields for the Trunk Group Number length, the Originating Network Address length and the Terminating Network Address length. The CBR would further include a cause value field, an OII field for the Operator Involvement Indicator, an OLIP field for the Originating Line Information Parameter, a Dialing Indicator field, an ANI field for an IEC/INC/ANI indicator and a Routing Indicator field. These fields are processed and populated by the function 127 of FIG. 7 as follows. D When the Trunk Group Number, Calling or Charge Number and Called Number are extracted from the respective MSUs and copied into the corresponding fields of the CBR as described, the associated length data is also extracted from the MSUs and copied into the respective length fields of the CBR. If the MSU is a release message, the cause value is extracted therefrom and copied into the corresponding field of the CBR.

The originating IAM is examined for the presence of the TNS or CIP. Based on the existence of one or the other of these parameters, or the non-existence, and the nature of the address indicator in the Called Party Number parameter of the IAM, the OII field in the CBR is set appropriately. Thus, if the carrier ID field 142 of the CBR is populated, the OII of the CBR is populated based on the indications in the Called Party Number parameter. Values of no interpretation, subscriber number, national significant number, international, or 950 call are indicated in the CBR. If the carrier ID field 142 of the CBR is not populated, the OII field of the CBR is populated based on indications in the Called Party Number parameter. In this case, values of no number-operator requested or 950 call are indicated in the OII field of the CBR.

Originating IAMs are examined for the presence of the OLIP. If present, a value indicating the appropriate information for specified desired values is included in the CBR. Thus, the function 127 of FIG. 7 examines the IAM messages for the presence of OLIP, and if present and the call is an access call, the OLIP of the CBR is populated with such service information as either hotel, 800, coin line, or restricted coin line as appropriate.

The function 127 of FIG. 7 examines originating IAM messages for the presence of the Carrier Selection Information (CSI) parameter. Based on the information in this parameter, the Dialing Indicator field of the CBR is set. If CSI is found, the Dialing Indicator is populated for originating messages and the field remains zero for terminating messages. If the OII field indicates a 950 call, the Dialing Indicator field is populated to indicate that a 950 call is dialed.

The Routing Indicator in the CBR is populated as either tandem routed or direct access based on the determination of the CAP LEC combination. If either one is a tandem, the Routing Indicator value is tandem routed. The platform configuration tables discussed above are utilized to determine if a CAP or LEC point code is a Tandem Office.

As discussed above, the IAM may include a Calling Number parameter or a Charge Number parameter, or neither or both such parameters. The ANI field of the CBR is populated to indicate which of these four conditions exist for the IAM.

Referring again to FIG. 4, the message correlation function 111 provides the processing to correlate call message information received in CBRs from the message screening function 110, calculate timing and necessary data from this information, and supply the data required to construct the Automatic Message Accounting (AMA) data in Bellcore AMA Format (BAF) records to the BAF record formatting function 112. A balanced tree algorithm is utilized to correlate the EXM, ACM, ANM, RSC and REL information with the corresponding IAM information. Each node of the tree represents one set of data for a call, and each node is initiated when call message information is received from the message screening function 110 in a CBR. The node data structures for storing the information is depicted in FIGS. 9 and 10 to be discussed.

Thus, when the IAM information is received, the data in the CBR therefor, including the time and date, are stored in the appropriate fields of the data structures of FIGS. 9 and 10. When EXM, ACM, and ANM information is received from message screening 110, the time and date of the messages are stored in the node. When the RSC or REL information is received, the time and date of the message is also stored in the node and the correlation function 111 initiates the preparation of a Billing Data Record (BDR) so as to prepare the call data for transmission to the BAF formatting function 112.

Thus, when all message data for a call has been received and the data has been stored in the appropriate tree node, the preparation of the BDR is initiated. Construction of the BDR processes one complete set of data for an AMA call and supplies the data necessary to construct the appropriate BAF record. Processing of a long duration connection call also initiates generation of a BDR. The BDR is illustrated in FIG. 11 and will be described below.

In constructing the BDR, the elapsed time and connect time for the call are calculated. Elapsed time and connect time are determined based on Call Code (access time for Call Code 883; conversion time for Call Code 884). Connect time for access calls is time of receipt of ACM, while connect time for conversation calls is time of receipt of ANM. The connect time for access calls may also be based on ANM if ACM is not received and on EXM, in a manner to be described. A user settable Exit Timer (EXIT) is included for use in adjusting the access charges in a manner to be described. Call completion time for both access and conversation calls is based on earliest time of receipt of the RSC message or the REL message.

All times are adjusted for STP lag time, a user-entered value which accounts for the time required for STP throughput. This value is added to message receipt time for messages with a direction indication of sent and subtracted from message receipt time for messages with a direction indication of received. The STP lag time computation will be further described with respect to FIG. 8.

Thus, the data pertaining to the call, as stored in the node, is reformatted into the BDR and the node is cleared and marked as unused. The cleared and marked node is thus flagged for reuse.

Figure 8:
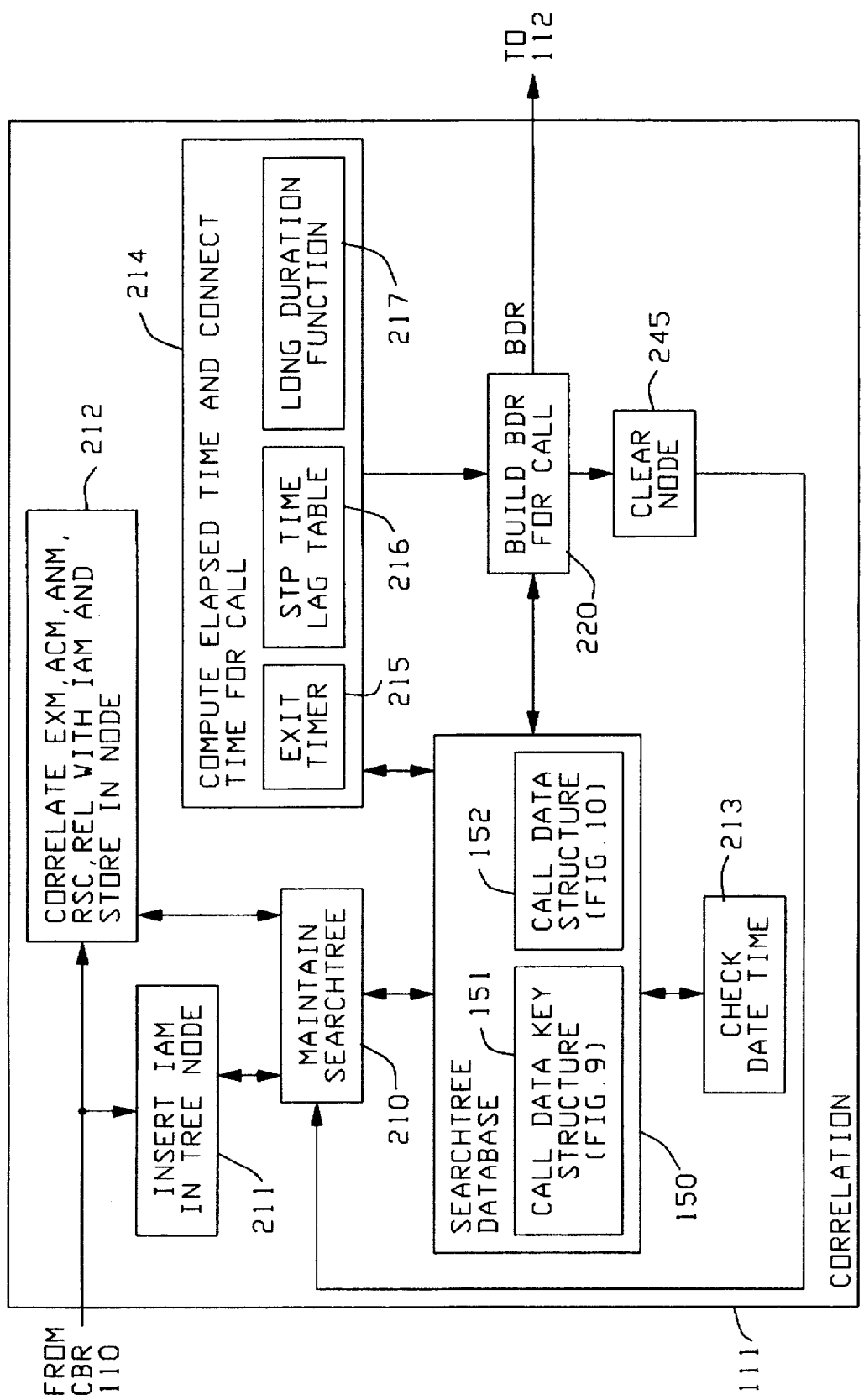
FIG. 8 is a schematic block diagram illustrating details of the correlation component of FIG. 4.

Referring now to FIGS. 8–11, details of the correlation function 111 are depicted. FIG. 8 illustrates the correlation function 111 as including a searchtree database 150. The searchtree database 150 includes a plurality of nodes organized in a balanced searchtree architecture where each node is utilized to store the data for a call being processed. Each node of the searchtree database 150 includes a Call Data Key Structure 151 and a Call Data Structure 152 as depicted in FIGS. 9 and 10, respectively. The searchtree database 150 utilizes a balanced tree architecture for storing call search keys and call data so as to facilitate correlating the IAM and subsequent ISUP messages.

Specifically, a modified multiway balanced searchtree algorithm is utilized based on that found in the book "Data Structures And Program Design In C", by Robert L. Kruse, Bruce P. Leung and Clovis L. Tondo, ISBN 0-13-725649-3, published by Prentice-Hall, Inc. of Englewood Cliffs, N.J. in 1991, section 10.3 "Balanced Multiway Trees" on pages 367–381.

With reference to FIG. 9, the Call Data Key Structure 151 includes fields 160–166 for storing call data relating to the search keys utilized in the correlation process as well as data relating to the searchtree architecture and processing. The IAM, EXM, ACM, ANM, RSC and REL messages are correlated utilizing, as search keys, the CIC, Point Code 1 and Point Code 2 values found in fields 138, 135 and 136, respectively, of the CBR (FIG. 6) for all messages. These search keys are stored in fields 160–162, respectively, of the Call Data Key Structure 151.

Field 163 of the Call Data Key Structure 151 contains a pointer to the parent key node of a node under consideration in the searchtree structure. Field 164 contains a used/unused marker indicating whether the node is occupied with a call or is available to provide processing for a new call. The algorithm used for the tree structure is a multiway balanced tree, the "multiway" referring to the key node having multiple key entries contained within its structure. The field 165 contains a pointer to a child node used in branching and, as indicated, points to key values greater than the key under consideration but less than the next key in the node. The Call Data Key Structure 151 may also include a field (not shown) for indicating the number of keys in the current node. The field 166 contains a pointer to the Call Data Structure (FIG. 10) that contains the remaining call specific data.

With reference to FIG. 10, the Call Data Structure 152 of a node of the searchtree database 150 is illustrated. The Call Data Structure 152 is comprised of fields 170–194. Field 170 contains an indication of the Call Type. This information is taken from field 144 of the CBR (FIG. 6) for the IAM for the call. Fields 171–180 contain the date/time and the timestamp for the various ISUP messages as indicated in FIG. 10. This information is derived from fields 133 and 134 of the CBR (FIG. 6) for the various messages. It is appreciated that the description given in field 171 of "seconds since midnight Jan. 1, 1970 GMT" also applies to fields 173, 175, 177, and 179. Fields 181–185 and 192 are filled directly from CBR fields 142, 139, 140, 143, 141, and 137, respectively. The CBR for the particular ISUP message is indicated in the source column of the Call Data Structure field. The field 186 contains a used/unused marker similar to that described above with respect to the Call Data Key Structure of FIG. 9. Fields 187–191 contain indications of whether or not the various ISUP messages have been received for the node. The field 193 contains a Guard Indicator that is set when an incomplete billing record is written. The Guard Indicator is set when creating a default record for an access call where the IAM is received but no other correlating MSUs are received. The field 194 contains a Long Duration Indicator set by the long duration function in the correlation function 111 and is set to 1 if the elapsed time is greater than or equal to 24 hours and is set to 2 if the elapsed time is greater than or equal to 48 hours.

The fields 193 and 194 are utilized to provide records for long duration calls. The Call Data Structure of FIG. 10 also includes fields (not shown) to contain current date and time, as well as tenths of a second of current time, for use in processing long duration connection calls in a manner to be further described.

It is appreciated that the release field 179 is set by the long duration function of the correlation function 111 when the Long Duration Indicator of field 194 is greater than zero.

In the above mentioned product application program embodiment of the invention, the Call Data Structure 152 of FIG. 10 would, in addition, include length fields (not shown) for the Trunk Group Number, the Originating Number and the Terminating Number. The Trunk Group Number length field would be filled from the corresponding length field of the CBR for the EXM and the Originating Number and Terminating Number length fields would be filled from the corresponding length fields of the CBR for the IAM as described above. In addition, the Call Data Structure of FIG. 10 would include an OII field (not shown) filled from the corresponding Operator Involvement Indicator field of the CBR for the IAM, an CLIP field (not shown) containing service feature information filled from the CLIP field of the CBR for the IAM and Dialing Indicator, Routing Indicator and IEC INC ANI Indicator fields (not shown) filled from the corresponding fields of the CBR for the IAM. These length fields, as well as the OII, CLIP, Dialing Indicator, Routing Indicator and IEC INC ANI Indicator, are of type character.

With reference again to FIG. 8, the correlation function 111 includes a maintain searchtree function 210 that contains all of the functionality required to maintain the searchtree database 150. Such functionality includes the capability for inserting nodes, deleting nodes, entering CBR data into nodes, searching for node keys, restructuring searchtree, etc.

The correlation function 111 includes a function 211 for inserting a received IAM into an appropriate node of the searchtree database 150. The node should be unused, as indicated by the used/unused markers of FIGS. 9 and 10, and should be inserted into a tree branch in accordance with the CIC, Point Code 1 and Point Code 2 key values so as to facilitate searching for the node with respect to subsequently received ISUP messages for the call. As discussed above, the data of the CBR (FIG. 6) is inserted into the corresponding fields of the Call Data Key Structure (FIG. 9) and the Call Data Structure (FIG. 10).

The correlation function 111 includes a function 212 for correlating the EXM, ACM, ANM, RSC and REL ISUP messages with the corresponding IAM message for a call. The CBR data for these messages are stored in the node together with the IAM data as indicated in the structures of FIGS. 9 and 10. Thus, a node that is processing a call will be storing the data from the call ISUP messages having the same CIC, Point Code 1 and Point Code 2. These parameters uniquely define the voice circuit of the call. The functions 211 and 212 utilize the searchtree maintenance functionality 210 to locate the node for the call and to insert the data therein.

To ensure that all the ISUP messages for one call setup are correctly correlated, a check date time function 213 is included. The function 213 checks the incoming messages date and timestamp fields against the date and timestamps of the other messages held for the same keys. If the date/timestamp places the new data in the correct order (IAM, EXM, ACM, ANM, RSC, REL), then an indication of appropriate operation is given. If, however, the date/timestamp places the new data out of order, an error indication is given.

The correlation function 111 includes a function 214 for computing the elapsed time and connect time for a call when all of the node data has been stored therefor. The function 214 includes an Exit Timer register 215 for storing the user-settable Exit Timer value EXIT for use in adjusting the access charges. The Exit Timer shall preferably have a definable range of 0.5 seconds to 2.5 seconds. The value of EXIT is entered at the user terminals 88 (FIG. 4) and stored in the register 215. The function 214 also includes table 216 for storing the time lags for the various STPs providing ISUP message transport for the point codes monitored by the EOI and TB applications. As discussed above, the data for table 216 is entered and stored as part of system configuration.

The function 214 uses the table 216 to obtain the time lag adjustment for the STP associated with the Point Code 1 and Point Code 2 data. The time adjustment is applied to each timestamp, as discussed above, by adding the adjustment for messages with a direction indication of sent and subtracting the adjustment for messages with a direction indication of received. The direction is derived from field 132 of the associated CBR (FIG. 6) for the message and stored (not shown) in the node.

The function 214 next determines the connect or start time for the call. For a Call Type of conversation, timing begins with the receipt of the ANM. Thus, for Call Type conversation, the fields 177 and 178 of the Call Data Structure 152 (FIG. 10) are utilized. The start time is computed in seconds and tenths of seconds from the data in the fields 177 and 178.

The start time for Call Type of access is computed utilizing the EXM, ACM, and ANM messages, as well as the value of EXIT in Exit Timer register 215. The start time for calculating access charges begins with the receipt of an ACM message or an ANM message if ACM is not received. However, the start time for calculating access charges will be when the Tandem sends an EXM to the originating switch if it is sent before an ACM or ANM.

If, however, the time differential between sending an IAM and receiving an EXM is greater than EXIT, the access charges are calculated using a start time of when the IAM was sent plus the value of EXIT; otherwise, access charges are calculated based on time of receipt of EXM.

If an EXM is not received, but an ACM is received, the time differential between sending the IAM and receiving the ACM is verified as not greater than EXIT. Access charges are then calculated based on time of receipt of ACM. If the differential is greater than EXIT, the access charges are calculated using a start time of when the IAM was sent plus the value of EXIT.

If neither the EXM nor the ACM is received, but an ANM is received, the time differential between sending the IAM and receiving the ANM is verified as not greater than EXIT. Access charges are then calculated based on time of receipt of ANM. If the differential is greater than EXIT, the access charges are calculated using a start time of when the IAM was sent plus the value of EXIT.

In other words, for access calls, the start time and tenths should be within the time EXIT from the IAM time. If it is not within this time, then the start time and tenths is reset to the IAM time plus the EXIT time. The start time and tenths for Call Type access is derived from fields 171–178 of the Call Data Structure 152 (FIG. 10).

For both Call Types access and conversation, the call completion or end time is based on the time of receipt of the RSC message, or the REL message, whichever is received first. Thus, end time and tenths is derived from fields 179 and 180 of the Call Data Structure 152 (FIG. 10).

The function 214 computes the elapsed time for the call by subtracting the start time and tenths from the end time and tenths.

The function 214 includes a long duration function 217 that sets the Long Duration Indicator 194 of the Call Data Structure 152 as described above. The Long Duration Indicator 194 has a default value of zero and the long duration function 217 sets the indicator 194 to 1 if elapsed time is greater than or equal to 24 hours and to 2 if elapsed time is greater than or equal to 48. It is appreciated that the function 214 computes the elapsed time for long duration calls by using the BAF Record Generation Time as the end time when a Long Duration Indicator (not shown) is set to indicate long duration processing.

The Correlation Function 111 includes a function 220 for building the Billing Data Record (BDR) for the call utilizing the information in the Call Data Key Structure 151 (FIG. 9) and in the Call Data Structure 152 (FIG. 10) as well as the computations performed by the function 214. The BDR is built when the data contains sufficient data to complete a billing record and when a long duration call connection is determined by the function 217. The BDR is transmitted to the BAF record formatting function 112 (FIG. 4) for generating the AMA records. The structure of the BDR is illustrated in FIG. 11 and comprises fields 225–242.

Referring to FIG. 11 with continued reference to FIGS. 8–10, the Record Type field 225 contains a header identifying the type of record. The CAP Point Code field 226 is derived from Point Code 2 field 162 of the Call Data Key Structure 151 of FIG. 9. The LEC Point Code field 227 is derived from the Point Code 1 field 161 of the Call Data Key Structure 151 of FIG. 9. The Call Code field 228 is derived from the Call Type Field 170 of the Call Data Structure 152 of FIG. 10. The current date and time fields 229 and 230 indicate the current date and time that the BDR is built by the build BDR function 220. The function 220 derives the current date and time from the time standard discussed in said Ser. No. 08/344,316. Current time is used by the applications 92 in long duration call processing and reporting. The Carrier ID field 231 is derived from the Carrier ID field 181 of the Call Data Structure 152 of FIG. 10. The Originating Number and Terminating Number fields 232 and 233 are derived from the corresponding fields 183 and 184 of the Call Data Structure 152 of FIG. 10. The CIC field 234 is derived from the corresponding field 160 of the Call Data Key structure 151 of FIG. 9. The Signaling Linkset Index field 235, the Trunk Group Number field 236 and the International Indicator field 237 are derived from the corresponding fields 192, 182 and 185, respectively, of the Call Data Structure 152 of FIG. 10. The Elapsed Time and Connect Date Time fields 238–240 are provided by the function 214 of FIG. 8 as described above. The Guard Indicator field 241 and the long duration field 242 are derived from the corresponding fields 193 and 194 of the Call Data Structure 152 as described above with respect to FIG. 10.

The BDR in the product application program embodiment discussed above would also include the following fields (not shown): an OII field, a service feature (OLIP) field, a Trunk Group Number length field, an ONA length field, a TNA length field, a Dialing Indicator .field, a Routing Indicator field and an IEC/INC/ANI Indicator field. The contents of these fields are derived from the respective corresponding fields of the Call Data Structure 152 discussed above. These fields are all of type character. The BDR would also include a Call Event Status field (not shown) of type character that is set based on which MSUs are received and denotes whether the call was normal, abandoned before the ANM or abandoned after the ANM.

Referring again to FIG. 8, after the function 220 builds the BDR for transmission to the BAF record formatting function 112, a function 245 clears the node for the call through the maintain searchtree function 210. The maintain searchtree function 210 deletes all of the data in the Call Data Key Structure 151 and Call Data structure 152 of the node and marks the fields 164 and 186 as unused.

With reference again to FIG. 4, the BAF record formatting function 112 constructs the appropriate BAF records from the data supplied in the BDR (FIG. 11) from the correlation function 111. The BAF records are illustrated in FIGS. 12a–12c and are provided on the output 87 of the platform 80 for transmission to the Revenue Accounting Office (RAO).

Referring to FIGS. 12a–12c and with continued reference to FIGS. 4 and 11, the BAF record formatting function 112 formats AMA call data provided in the BDRs (FIG. 11) by the message correlation function 111 into BAF records. A BAF record is composed of a structure and zero or more modules as defined by Bellcore GR-1100-CORE and TR-NWT-001100 which are incorporated herein by reference. Structures and modules are composed of tables (fields). The BAF records generated by the BAF record formatting function 112 are schematically depicted in FIGS. 12a–12c and contain a Structure Code 8010, a Module Code 022 and a Module Code 104. The Structure Code 8010 is denoted as an AMA Format for SS7 Derived Tandem AMA, the Module Code 022 is denoted as a Long Duration Connection Module, and the Module Code 104 is denoted as a Trunk Identification Module. FIG. 12a depicts the Structure Code 8010, FIG. 12b depicts the Module Code 022, and FIG. 12c depicts the Module Code 104.

The BAF record formatting function 112 processes the BDRs (FIG. 11) translating the BDR data to produce the BAF records in the formats necessary for the SS7 Derived Tandem AMA structure, the Long Duration Connection Module and the Trunk Identification Module. Conversions and translations are performed using system database accesses. The formats for the structure and modules constructed by function 112 are provided in FIGS. 12a–12c.

Referring to FIG. 12a, Structure Code 8010 is depicted including fields 250–266. Fields 250–252 identify the record and structure. Field 253 contains the Call Code which is derived from field 228 of the BDR. The Call Code is either for access or conversation time measurement. The field 254 contains the Linkset ID which is derived from field 235 of the BDR.

The field 255 includes a Recording Office Identification which is explained as follows. The applications 92 deployed on the platform 80, which embody the present invention, are denoted as End Office Integration (EOI) and Tandem Billing (TB). As explained, these applications are similar with respect to each other and, for convenience, may generically be denoted as the Call Billing (CB) application. In use of the platform 80, the RAO of the user telephone company opens a transmission session with the platform 80 to call for BAF files. The Recording Office ID in field 255 is used to identify the application for which the RAO is opening the session. In this case the application is CB. In other words, the RAO identifies that it is making a request for BAF CB data by use of the Recording Office ID field in a session connect message sent by the RAO to the platform 80.

The user terminals 88 (FIG. 4) provide a user interface entry window for entering the Recording Office ID to be used in the construction of the BAF record of FIG. 12a. A sequence of screens on the user terminals 88 permit the user to first select the CB application and the user is then provided with the window in which to enter the Recording Office ID. In this manner, the Recording Office ID entered by the user is linked to the application that is generating the particular Structure Code 8010. In other words, field 255 identifies the application (in this case CB) deployed on the platform 80 with respect to which the RAO is requesting data.

With continued reference to FIG. 12a, field 256 contains a Date of Answer which is derived from fields 239 and 240 of the BDR. The Timing Indicator field 266 is derived from fields 241 and 242 of the BDR and indicates if the record is for a long duration connection call. The Answer Indicator field 257 is derived from field 228 of the BDR and is populated in accordance with Call Code. Originating NPA field 258 and Originating Number field 259 are derived from BDR field 232. The Overseas Indicator field 260 and the Terminating Number field 261 are derived from respective BDR fields 237 and 233. The Connect Time field 262 is derived from BDR fields 239 and 240 while the Elapsed Time field 263 is derived from BDR field 238. The IEC/INC Prefix field 264 is derived from BDR field 231. The field 265 is utilized to provide the Trunk Group Number when it is received in the EXM. This Trunk Group Number is derived from field 236 of the BDR.

In the manner described above, the Structure Code 8010 would include additional fields in a product application program embodiment of the invention. These fields, and associated Table Numbers, are as follows: Service Feature (Table Number 12), Routing Indicator (Table Number 59), Dialing Indicator (Table Number 85), IEC/INC ANI/CPN Indicator (Table Number 60), IEC/INC Call Event Status (Table Number 58). These fields are derived from the corresponding respective fields of the BDR, as discussed above. The IEC/INC ANI/CPN Indicator is derived from the IEC INC ANI Indicator of the BDR and the IEC/INC Call Event Status field is derived from the BDR Call Event Status field discussed above. It is appreciated that a complete description of the BAF Records and fields is found in said GR-1100-CORE.

Referring to FIG. 12b, Module Code 022—Long Duration Connection Module, is illustrated. The Module 022 is comprised of a Module Code field 270, a Present Date field 271 and a Present Time field 272. The Present Date of field 271 is derived from the Current Date and Time field 230 of the BDR and the Present Time of field 272 is derived from the Current Date and Time and Current Time tenths fields 230 and 229 of the BDR. The Module Code 022 is appended to the Structure Code 8010 when the call elapsed time is greater than or equal to 48 hours as indicated by the BDR long duration field 242. The Module Code 022 is also appended to Structure Code 8010 when a call completes with an elapsed time greater than 24 hours as indicated by the BDR long duration field 242. The details of long duration call processing and reporting are fully explained in said GR-1100-CORE which is incorporated herein by reference.

Briefly, the first record of a long duration connection is generated at the first scheduled BAF Record Generation Time after the elapsed time of the call exceeds 24 hours. The elapsed time for the first record of this call is the interval from call connect time to the time when the record is generated and reflects the end time being set at the BAF Record Generation Time as discussed above. The Timing Indicator field 266 indicates that this is the first record of a long duration connection sequence. A continuation record is generated at each BAF Record Generation Time that occurs between the time a call's first records is made and call disconnect. A continuation record is also generated at call disconnect. A continuation record contains the Module Code 022. The Present Date and Present Time fields 271 and 272 include the date and time when the record is generated. A continuation record is denoted by the Timing Indicator field 266. The elapsed time reported in a continuation record is the interval from the time when the previous record was generated to either the time the current record is generated or the time the call disconnects. As discussed above, the Call Data Structure (FIG. 10) includes a Current Time field (not shown) for storing start time updates as continuation records are generated.

Referring to FIG. 12c, Module Code 104—Trunk Identification Module, is illustrated. The Module 104 is comprised of a Module Code field 280 and a Trunk Identification field 281. The Module 104 Trunk Group Number is provided for all calls and is derived from the Circuit Identification Code in the IAM. The Circuit ID from the IAM message and the OPC/DPC are used in identifying the actual trunk group used for call setup. Thus, the Module 104 Trunk Identification is derived from fields 226, 227 and 234 of the BDR and is obtained from the platform configuration tables, as described above, using the CIC, OPC and DPC.

It is appreciated from FIGS. 12a–12c that the BAF records constructed by the platform 80 provide the RAO with the information required to generate accurate call duration billing records identifying the appropriate entities to bill. The Trunk Group Numbers in the field 265 of FIG. 12a and in the field 281 of FIG. 12c permit the RAO to accurately identify the telephone companies to bill.

Thus, it is appreciated that the platform 80 monitoring CCS links with the Call Billing (CB) applications deployed thereon, as described, determines the actual duration of telephone calls by collecting the specified ISUP messages and, based on the arrival times of these messages, determines the duration of all calls between user-specified point codes. In this manner, the LEC can generate and validate charges relating to a CAP's use of the LEC's trunks and equipment.

The information gathered from the MSUs correlated for a call together with the MSU audit data, such as time, date, direction and linkset source, are processed by the present invention to generate accurate billing records. Specifically, appropriate ones of the IAM, EXM, ACM, ANM, RSC and REL are correlated and processed, as discussed above, to generate the records. The IAM, EXM, ACM and ANM may be considered as call setup MSUs with the IAM considered as a call originating MSU while RSC and REL may be considered as call terminating MSUs.

The above described embodiment of the invention is explained in terms of utilizing RSC and REL for call termination detection. It is appreciated that an embodiment may also be constructed utilizing REL and RLC as the call terminating MSUs. In such an embodiment, end time would be based on the time of receipt of the REL message, or the RLC message if REL is not received. In this embodiment, the proper order of messages for the purpose of the check date time function 213 would be IAM, EXM, ACM, ANM, REL, RLC. It is understood, however, that the embodiment utilizing RLC would generate inappropriate elapsed time measurements for calls where neither REL or RLC is received. Since it is expected an RSC or an REL would be received for a call, the best mode embodiment is that described above utilizing RSC and REL.

As a further variant of the invention, RLC may be used as a measure of call termination in combination with the embodiment described above that utilizes RSC and REL.

While the invention has been described in its preferred embodiment, it is to be understood that the words which have been used are words of description rather than of limitation and that changes may be made within the purview of the appended claims without departing from the true scope and spirit of the invention in its broader aspects.

We claim:

1. In a telephone network that includes a Common Channel Signaling (CCS) network designed to transport SS7 Signal Units (SU), said SUs including Message Signal Units (MSU), said telephone network having switching offices with respect to which telephone calls can be set up and terminated, said switching offices setting up a particular call by transmitting on said CCS network call setup MSUs of respective call setup types containing call data identifying said particular call, said switching offices terminating said particular call by transmitting on said CCS network call terminating MSUs of respective call terminating types containing said call data, said CCS network including means for copying said SUs transitting said CCS network, apparatus for generating a call duration billing record for said particular call, comprising:

input means for receiving said copied SUs and applying a timestamp to each of said copied SUs in accordance with the time of receipt thereof, filtering means responsive to said copied SUs for selectively passing MSUs of said call setup and call terminating types, correlating means responsive to said passed MSUs for correlating said call setup and call terminating MSUs with each other in accordance with said call data so as to obtain correlated call setup and call terminating MSUs for said particular call, elapsed time computing means responsive to said correlated call setup and call terminating MSUs for computing elapsed time of said particular call in accordance with the difference between a start time and an end time of said particular call, said start time based on the timestamp of one of said correlated call setup MSUs and said end time based on the timestamp of one of said correlated call terminating MSUs, and record generating means for generating said call duration billing record for said particular call from said correlated MSUs, said record generating means operative to generate said call duration billing record including said elapsed time of said particular call.

2. The apparatus of claim 1 wherein said call setup MSUs include a call originating MSU and subsequent call setup MSUs, said call originating MSU and said subsequent call setup MSUs containing said call data, said correlating means operative for correlating said subsequent call setup MSUs and said call terminating MSUs with said call originating MSU in accordance with said call data.

3. The apparatus of claim 2 wherein said MSUs include MSUs of an Integrated Services Digital Network User Part (ISUP) category and said ISUP category MSUs include ISUP MSU types of Initial Address Message (IAM), Exit Message (EXM), Address Complete Message (ACM), Answer Message (ANM), Reset Circuit Message (RSC), Release Message (REL) and Release Complete Message (RLC), said filtering means being operative for passing said ISUP MSU types of said IAM, EXM, ACM and ANM and a plurality of said RSC, REL and RLC.

4. The apparatus of claim 3 wherein said call originating MSU comprises said IAM, said subsequent call setup MSUs comprise said EXM, ACM and ANM, and said call terminating MSUs comprise said plurality of said RSC, REL and RLC.

5. The apparatus of claim 4 wherein said plurality of said RSC, REL and RLC Comprises said RSC and REL.

6. The apparatus of claim 4 wherein said elapsed time computing means is operative to base said start time on the timestamp of said IAM.

7. The apparatus of claim 4 wherein said elapsed time computing means is operative to base said start time on the timestamp of said EXM.

8. The apparatus of claim 4 wherein said elapsed time computing means is operative to base said start time on the timestamp of said ACM.

9. The apparatus of claim 4 wherein said elapsed time computing means is operative to base said start time on the timestamp of said ANM.

10. The apparatus of claim 4 wherein said elapsed time computing means is operative to base said end time on the timestamp of said RSC.

11. The apparatus of claim 4 wherein said elapsed time computing means is operative to base said end time on the timestamp of said REL.

12. The apparatus of claim 4 wherein said elapsed time computing means is operative to base said end time on the timestamp of said RLC.

13. The apparatus of claim 8 wherein said elapsed time computing means is operative to base said start time on the timestamp of said ANM if said ACM is not received.

14. The apparatus of claim 8 wherein said elapsed time computing means is operative to base said start time on the timestamp of said EXM if said timestamp of said EXM is earlier than said timestamp of said ACM.

15. The apparatus of claim 9 wherein said elapsed time computing means is operative to base said start time on the timestamp of said EXM if said timestamp of said EXM is earlier than said timestamp of said ANM.

16. The apparatus of claim 7 wherein said elapsed time computing means is operative to base said start time on the timestamp of said IAM plus a predetermined time interval if said timestamp of said IAM plus said predetermined time interval is earlier than said timestamp of said EXM.

17. The apparatus of claim 8 wherein said elapsed time computing means is operative to base said start time on the timestamp of said IAM plus a predetermined time interval if said timestamp of said IAM plus said predetermined time interval is earlier than said timestamp of said ACM.

18. The apparatus of claim 9 wherein said elapsed time computing means is operative to base said start time on the timestamp of said IAM plus a predetermined time interval if said timestamp of said IAM plus said predetermined time interval is earlier than said timestamp of said ANM.

19. The apparatus of claim 1 in which said CCS network includes Signaling Transfer Points (STP) for routing said SUs transitting said CCS network, each said STP having an STP lag time associated therewith in accordance with throughput thereof, said apparatus further comprising timestamp adjusting means for adjusting the timestamps of said correlated MSUs in accordance with said STP lag times so as to compensate said elapsed time for said STP lag times.

20. The apparatus of claim 19 wherein said CCS network includes links connected with said STPs through which said SUs are transported, said means for copying said SUs being operative for copying said SUs from said links, each said SU having a transit direction on a link from which the SU is copied, said direction being "sent" if the SU is sent to the link from which it is copied by an STP connected to the link or "received" if the SU is received from the link from which it is copied by an STP connected to the link, said timestamp adjusting means being operative to adjust the timestamp of a particular MSU copied from a particular link having a particular STP connected thereto by adding the STP lag time of said particular STP to the timestamp of said particular MSU when the direction of said particular MSU is "sent" with respect to said particular STP or subtracting said STP lag time of said particular STP from said timestamp of said particular MSU when said direction of said particular MSU is "received" with respect to said particular STP.

21. The apparatus of claim 5 wherein
each of said correlated MSUs includes an Originating Point Code (OPC), a Destination Point Code (DPC) and a Circuit Identification Code (CIC), and
said call data identifying said particular call comprises said OPC, DPC and CIC,
said correlating means operative for correlating said EXM, ACM, ANM, RSC and REL with said IAM using said OPC, DPC and CIC as correlation search keys.

22. The apparatus of claim 21 wherein
each of said correlated MSUs has further call data associated therewith related to said particular call, and
said correlating means includes searchtree database means having searchtree nodes for storing information relating to respective telephone calls, said information in a particular node comprising said OPC, DPC and CIC correlation search keys of said particular call and said further data related to said particular call, said particular node storing said elapsed time of said particular call.

23. The apparatus of claim 22 wherein said record generating means is operative for generating said call duration billing record for said particular call from said information in said particular node.

24. The apparatus of claim 22 wherein said correlating means is operative for inserting said IAM in said particular node of said searchtree by inserting said OPC, DPC and CIC of said IAM as correlation search keys and inserting said further call data associated with said IAM in said particular node,
said correlating means further operative to correlate subsequently occurring ones of said EXM, ACM, ANM, RSC and REL with said IAM by searching through said searchtree nodes using said correlation search keys to find said particular node storing said OPC, DPC and CIC so as to find said particular node storing said IAM,
said correlating means further operative to store said further call data associated with said correlated subsequently occurring ones of said EXM, ACM, ANM, RSC and REL in said particular node.

25. The apparatus of claim 5 wherein said correlating means includes date/time check means responsive to said correlated MSUs for determining if a plurality of correlated MSUs are in appropriate order of receipt by determining if the respective timestamps thereof are in appropriate time sequence.

26. The apparatus of claim 25 wherein said appropriate order of receipt of said correlated MSUs comprises IAM, EXM, ACM, ANM, RSC and REL.

27. The apparatus of claim 1 further including connect time determining means for determining connect time of said particular call based on said start time.

28. The apparatus of claim 1 wherein said switching offices include at least one Competitive Access Provider End Office (CAP EO) or at least one CAP Tandem Office, said CCS network includes at least one Local Exchange Carrier Signaling Transfer Point (LEC STP) and links connecting said LEC STP with said CAP EO and said CAP Tandem Office for transporting said SUs therebetween,
said means for copying operative for copying said SUs transitting said CCS network from said links,
said apparatus thereby monitoring said links to generate call duration billing records for calls controlled by said passed MSUs that transitted said links,
said call duration billing records including said call duration billing record for said particular call.

29. The apparatus of claim 28 wherein said CCS network further includes a CAP STP and links connecting said CAP STP to one or more of said CAP EO and CAP Tandem Office, said CCS network including a further link connecting said LEC STP with said CAP STP,
said means for copying further operative for copying said SUs transitting said CCS network from said further link,
said apparatus thereby monitoring said further link for generating call duration billing records for calls controlled by said passed MSUs that transitted said further link.

30. The apparatus of claim 28 wherein
said call setup MSUs include MSUs of an Integrated Services Digital Network User Part (ISUP) category, said ISUP category MSUs include an ISUP type of Initial Address Message (IAM), each said passed MSU of said IAM type includes an Originating Point Code (OPC) and a Destination Point Code (DPC),
said filtering means includes a database storing valid OPC-DPC combinations for IAMs transitting said links controlling calls to be monitored by said apparatus, and
said filtering means includes means for matching said OPC and DPC of said passed MSUs of said IAM type with said OPC-DPC combinations stored in said database for validating said passed MSUs of said IAM type for processing.

31. The apparatus of claim 30 wherein each said SU has a transit direction on one of said links from which the SU is copied, said direction being "sent" or "received" if the SU is sent to said one link from said LEC STP or received from said one link by said LEC STP, respectively,
said database storing a valid transit direction with each said valid OPC-DPC combination,
said means for matching further operative for matching said transit direction of said passed MSUs of said IAM type with said valid transit directions stored in said database for validating said passed MSUs of said IAM type for processing.

32. The apparatus of claim 5 wherein
said switching offices include at least one Local Exchange Carrier End Office (LEC EO), at least one Competitive Access Provider End Office (CAP EO), at least one LEC Tandem Office, at least one CAP Tandem Office and at least one Interexchange Carrier Office (IXC),
said particular call is of a Call Type of access or a Call Type of conversation with said elapsed time of said particular call being access time or conversation time, respectively,
said particular call being of Call Type access if said particular call originated at a LEC EO and completed through a CAP Tandem or completed directly to a CAP EO, or originated at a CAP EO and completed through a LEC Tandem destined for an IXC, or terminated at a CAP EO through a LEC Tandem,
said particular call being of Call Type conversation if said particular call terminated at a LEC EO through a CAP Tandem or directly from a CAP EO, or originated from a CAP EO and completed through a LEC Tandem and not destined for an IXC.

33. The apparatus of claim 32 wherein said elapsed time of said particular call is access time and said elapsed time computing means is operative to base said start time on the timestamp of said ACM.

34. The apparatus of claim 33 wherein said elapsed time computing means is operative to base said start time on the timestamp of said ANM if said ACM is not received.

35. The apparatus of claim 33 wherein said elapsed time computing means is operative to base said start time on the timestamp of said EXM if said timestamp of said EXM is earlier than said timestamp of said ACM.

36. The apparatus of claim 34 wherein said elapsed time computing means is operative to base said start time on the timestamp of said EXM if said timestamp of said EXM is earlier than said timestamp of said ANM.

37. The apparatus of claim 32 wherein said elapsed time of said particular call is access time and said elapsed time computing means is operative to base said start time on the timestamp of said EXM.

38. The apparatus of claim 37 wherein said elapsed time computing means is operative to base said start time on the timestamp of said IAM plus a predetermined time interval if said timestamp of said IAM plus said predetermined time interval is earlier than said timestamp of said EXM.

39. The apparatus of claim 38 wherein said elapsed time computing means is operative, if said EXM is not received but an ACM is received, to base said start time on said timestamp of said IAM plus said predetermined time interval if said timestamp of said IAM plus said predetermined time interval is earlier than said timestamp of said ACM.

40. The apparatus of claim 39 wherein said elapsed time computing means is operative, if neither said EXM nor said ACM is received but an ANM is received, to base said start time on said timestamp of said IAM plus said predetermined time interval if said timestamp of said IAM plus said predetermined time interval is earlier than said timestamp of said ANM.

41. The apparatus of claim 32 wherein said elapsed time of said particular call is conversation time and said elapsed time computing means is operative to base said start time on the timestamp of said ANM.

42. The apparatus of any of claims 33 through 41 wherein said elapsed time computing means is operative to base said end time on the timestamp of said RSC or on the timestamp of said REL whichever is received first.

43. The apparatus of claim 1 wherein said record generating means is operative for generating said call duration billing record in a telecommunications standard format.

44. The apparatus of claim 43 wherein said record generating means is operative for generating said call duration billing record in Automatic Message Accounting (AMA) format.

45. The apparatus of claim 44 wherein said record generating means is operative for generating said call duration billing record in Bellcore AMA format (BAF).

46. The apparatus of claim 1 wherein said record generating means is further operative to generate said call duration billing record for said particular call including information identifying an entity to bill for elapsed time of said particular call.

47. The apparatus of claim 4 wherein
said switching offices include at least one Local Exchange Carrier (LEC) switching office and at least one Competitive Access Provider (CAP) switching office, said telephone network including at least one trunk group interconnecting a LEC switching office with a CAP switching office, a trunk group including circuits identified by Circuit Identification Codes (CIC) and having a Trunk Group Number associated therewith,
each of said IAMs includes an Originating Point Code (OPC), a Destination Point Code (DPC) and a Circuit Identification Code (CIC), said CIC of said IAM identifying one of said circuits of a trunk group,
said record generating means is operative for generating said call duration billing record from said correlated MSUs, including a correlated IAM, said record generating means further operative to generate said call duration billing record including a Trunk Group Number associated with said CIC in said correlated IAM.

48. The apparatus of claim 47 further including a configuration table of CICs and associated Trunk Group Numbers,
said record generating means being operative to derive said Trunk Group Number included in said call duration billing record from said CIC in said correlated IAM using said configuration table.

49. The apparatus of claim 47 further including a configuration table of CICs and associated Trunk Group Numbers, OPCs and DPCs,
said record generating means being operative to derive said Trunk Group Number included in said call duration billing record from said CIC, OPC and DPC in said correlated IAM using said configuration table.

50. The apparatus of claim 47 wherein said Trunk Group Number included in said call duration billing record provides information identifying an entity to bill for said elapsed time of said particular call.

51. The apparatus of claim 4 wherein
each of said EXMs includes a field containing a Trunk Group Number,
said record generating means is operative for generating said call duration billing record from said correlated MSUs, including a correlated EXM, said record generating means further operative to generate said call duration billing record including said Trunk Group Number from said correlated EXM.

52. The apparatus of claim 1 wherein said telephone calls include a long duration connection call, said switching offices setting up said long duration connection call by transmitting on said CCS network said call setup MSUs containing further call data identifying said long duration connection call, said switching offices terminating said long duration connection call by transmitting on said CCS network said call terminating MSUs containing said further call data, said apparatus further comprising apparatus for generating long duration billing records for said long duration connection call, each of said long duration billing records being generated at a periodically recurring predetermined time, said correlating means being operative for correlating said call setup and call terminating MSUs with each other in accordance with said further call data, said elapsed time computing means including further means responsive to said correlated call setup MSUs and any correlated call terminating MSUs received for said long duration connection call for computing long duration elapsed time of said long duration connection call in accordance with the difference between a further start time and a further end time, said further start time based on the timestamp of one of said correlated call setup MSUs for a first of said long duration billing records or on said predetermined time for subsequent ones of said long duration billing records, said further end time based on said predetermined time or on the timestamp of a correlated call terminating MSU for said long duration connection call if said correlated call terminating MSU is received, said record generating means being further operative for generating said long duration billing records for said long duration connection call including said long duration elapsed time of said long duration connection call.

53. In a telephone network that includes a Common Channel Signaling (CCS) network designed to transport SS7 Signal Units (SU), said SUs including Message Signal Units (MSU), said telephone network having switching offices with respect to which telephone calls can be set up and terminated, said switching offices setting up a particular call by transmitting on said CCS network call setup MSUs of respective call setup types containing call data identifying said particular call, said switching offices terminating said particular call by transmitting on said CCS network call terminating MSUs of respective call terminating types containing said call data, said CCS network including means for copying said SUs transitting said CCS network, a method for generating a call duration billing record for said particular call, comprising:

receiving said copied SUs, applying a timestamp to each of said copied SUs in accordance with the time of receipt thereof, selectively passing MSUs of said call setup and call terminating types from said copied SUs, correlating said call setup and call terminating MSUs with each other in accordance with said call data so as to obtain correlated call setup and call terminating MSUs for said particular call, computing elapsed time of said particular call in accordance with the difference between a start time and an end time of said particular call, said start time based on the timestamp of one of said correlated call setup MSUs and said end time based on the timestamp of one of said correlated call terminating MSUs, and generating said call duration billing record for said particular call from said correlated MSUs, said call duration billing record including said elapsed time of said particular call.

54. The method of claim 53 wherein said call setup MSUs include a call originating MSU and subsequent call setup MSUs, said call originating MSU and said subsequent call setup MSUs containing said call data, and said correlating step includes correlating said subsequent call setup MSUs and said call terminating MSUs with said call originating MSU in accordance with said call data.

55. The method of claim 54 wherein said MSUs include MSUs of an Integrated Services Digital Network User Part (ISUP) category and said ISUP category MSUs include ISUP MSU types of Initial Address Message (IAM), Exit Message (EXM), Address Complete Message (ACM), Answer Message (ANM), Reset Circuit Message (RSC), Release Message (REL) and Release Complete Message (RLC), said passing step includes passing said ISUP MSU types of said IAM, EXM, ACM and ANM and a plurality of said RSC, REL and RLC, said call originating MSU comprising said IAM, said subsequent call setup MSUs comprising said EXM, ACM and ANM, and said call terminating MSUs comprising said plurality of said RSC, REL and RLC.

56. The method of claim 55 wherein said plurality of said RSC, REL and RLC comprises said RSC and REL.

57. The method of claim 55 wherein said computing step includes basing said start time on the timestamp of said IAM.

58. The method of claim 55 wherein said computing step includes basing said start time on the timestamp of said EXM.

59. The method of claim 55 wherein said computing step includes basing said start time on the timestamp of said ACM.

60. The method of claim 55 wherein said computing step includes basing said start time on the timestamp of said ANM.

61. The method of claim 55 wherein said computing step includes basing said end time on the timestamp of said RSC.

62. The method of claim 55 wherein said computing step includes basing said end time on the timestamp of said REL.

63. The method of claim 55 wherein said computing step includes basing said end time on the timestamp of said RLC.

64. The method of claim 59 wherein said computing step includes basing said start time on the timestamp of said ANM if said ACM is not received.

65. The method of claim 55 wherein said computing step includes basing said start time on the timestamp of said EXM if said timestamp of said EXM is earlier than said timestamp of said ACM.

66. The method of claim 60 wherein said computing step includes basing said start time on the timestamp of said EXM if said timestamp of said EXM is earlier than said timestamp of said ANM.

67. The method of claim 58 wherein said computing step includes basing said start time on the timestamp of said IAM plus a predetermined time interval if said timestamp of said IAM plus said predetermined time interval is earlier than said timestamp of said EXM.

68. The method of claim 59 wherein said computing step includes basing said start time on the timestamp of said IAM plus a predetermined time interval if said timestamp of said IAM plus said predetermined time interval is earlier than said timestamp of said ACM.

69. The method of claim 60 wherein said computing step includes basing said start time on the timestamp of said IAM plus a predetermined time interval if said timestamp of said IAM plus said predetermined time interval is earlier than said timestamp of said ANM.

70. The method of claim 56 wherein each of said correlated MSUs includes an Originating Point Code (OPC), a Destination Point Code (DPC) and a Circuit Identification Code (CIC), said call data identifying said particular call comprises said OPC, DPC and CIC, and said correlating step includes correlating said EXM, ACM, ANM, RSC and REL with said IAM using said OPC, DPC and CIC as correlation search keys.

71. The method of claim 70 wherein each of said correlated MSUs has further call data associated therewith related to said particular call and said correlating step includes storing information relating to respective telephone calls in searchtree nodes of a searchtree database, said information in a particular node comprising said OPC, DPC and CIC correlation search keys of said particular call and said further data related to said particular call, and storing said elapsed time of said particular call in said particular node.

72. The method of claim 71 wherein said generating step includes generating said call duration billing record for said particular call from said information in said particular node.

73. The method of claim 71 wherein said correlating step includes inserting said IAM in said particular node of said searchtree database by inserting said OPC, DPC and CIC of said IAM as correlation search keys and inserting said further call data associated with said IAM in said particular node, correlating subsequently occurring ones of said EXM, ACM, ANM, RSC and REL with said IAM by searching through said searchtree nodes using said correlation search keys to find said particular node storing said OPC, DPC and CIC so as to find said particular node storing said IAM, and storing said further call data associated with said correlated subsequently occurring ones of said EXM, ACM, ANM, RSC and REL in said particular node.

74. The method of claim 53 wherein said switching offices include at least one Competitive Access Provider End Office (CAP EO) or at least one CAP Tandem Office, said CCS network includes at least one Local Exchange Carrier Signaling Transfer Point (LEC STP) and links connecting said LEC STP with said CAP EO and said CAP Tandem Office for transporting said SUs therebetween, said means for copying operative for copying said SUs transitting said CCS network from said links, said method comprising monitoring said links to generate call duration billing records for calls controlled by said passed MSUs that transitted said links, said call duration billing records including said call duration billing record for said particular call.

75. The method of claim 56 wherein said switching offices include at least one Local Exchange Carrier End Office (LEC EO), at least one Competitive Access Provider End Office (CAP EO), at least one LEC Tandem Office, at least one CAP Tandem Office and at least one Interexchange Carrier Office (IXC), said particular call is of a Call Type of access or a Call Type of conversation with said elapsed time of said particular call being access time or conversation time, respectively, said particular call being of Call Type access if said particular call originated at a LEC EO and completed through a CAP Tandem or completed directly to a CAP EO, or originated at a CAP EO and completed through a LEC Tandem destined for an IXC, or terminated at a CAP EO through a LEC Tandem, said particular call being of Call Type conversation if said particular call terminated at a LEC EO through a CAP Tandem or directly from a CAP EO, or originated from a CAP EO and completed through a LEC Tandem and not destined for an IXC.

76. The method of claim 75 wherein said elapsed time of said particular call is access time and said computing step includes basing said start time on the timestamp of said ACM.

77. The method of claim 76 wherein said computing step includes basing said start time on the timestamp of said ANM if said ACM is not received.

78. The method of claim 76 wherein said computing step includes basing said start time on the timestamp of said EXM if said timestamp of said EXM is earlier than said timestamp of said ACM.

79. The method of claim 77 wherein said computing step includes basing said start time on the timestamp of said EXM if said timestamp of said EXM is earlier than said timestamp of said ANM.

80. The method of claim 75 wherein said elapsed time of said particular call is access time and said computing step includes basing said start time on the timestamp of said EXM.

81. The method of claim 80 wherein said computing step includes basing said start time on the timestamp of said IAM plus a predetermined time interval if said timestamp of said IAM plus said predetermined time interval is earlier than said timestamp of said EXM.

82. The method of claim 81 wherein said computing step includes, if said EXM is not received but an ACM is received, basing said start time on said timestamp of said IAM plus said predetermined time interval if said timestamp of said IAM plus said predetermined time interval is earlier than said timestamp of said ACM.

83. The method of claim 82 wherein said computing step includes, if neither said EXM nor said ACM is received but an ANM is received, basing said start time on said timestamp of said IAM plus said predetermined time interval if said timestamp of said IAM plus said predetermined time interval is earlier than said timestamp of said ANM.

84. The method of claim 75 wherein said elapsed time of said particular call is conversation time and said computing step includes basing said start time on the timestamp of said ANM.

85. The method of any of claims 76 through 84 wherein said computing step includes basing said end time on the timestamp of said RSC or on the timestamp of said REL whichever is received first.

86. The method of claim 53 wherein said generating step includes generating said call duration billing record in a telecommunications standard format.

87. The method of claim 86 wherein said generating step includes generating said call duration billing record in Automatic Message Accounting (AMA) format.

88. The method of claim 87 wherein said generating step includes generating said call duration billing record in Bellcore AMA format (BAF).

89. The method of claim 53 wherein said generating step further includes generating said call duration billing record for said particular call including information identifying an entity to bill for said elapsed time of said particular call.

90. The method of claim 55 wherein said switching offices include at least one Local Exchange Carrier (LEC) switching office and at least one Competitive Access Provider (CAP) switching office, said telephone network includes at least one trunk group interconnecting a LEC switching office with a CAP switching office, a trunk group including circuits identified by Circuit Identification Codes (CIC) and having a Trunk Group Number associated therewith, each of said IAMs includes an Originating Point Code (OPC), a Destination Point Code (DPC) and a Circuit Identification Code (CIC), said CIC of said IAM identifying one of said circuits of a trunk group, said generating step comprising generating said call duration billing record from said correlated MSUs which include a correlated IAM, and including, in said call duration billing record, a Trunk Group Number associated with said CIC in said correlated IAM.

91. The method of claim 90 further comprising providing a configuration table of CICs and associated Trunk Group Numbers, said generating step including deriving said Trunk Group Number included in said call duration billing record from said CIC in said correlated IAM using said configuration table.

92. The method of claim 90 further comprising providing a configuration table of CICs and associated Trunk Group Numbers, OPCs and DPCs, said generating step including deriving said Trunk Group Number included in said call duration billing record from said CIC, OPC and DPC in said correlated IAM using said configuration table.

93. The method of claim 90 wherein said Trunk Group Number included in said call duration billing record provides information identifying an entity to bill for said elapsed time of said particular call.

94. The method of claim 55 wherein each of said EXMs includes a field containing a Trunk Group Number, said generating step comprising generating said call duration billing record from said correlated MSUs which include a correlated EXM, and including said Trunk Group Number from said correlated EXM in said call duration billing record.

95. The method of claim 53 wherein said telephone calls include a long duration connection call, said switching offices setting up said long duration connection call by transmitting on said CCS network said call setup MSUs containing further call data identifying said long duration connection call, said switching offices terminating said long duration connection call by transmitting on said CCS network said call terminating MSUs containing said further call data, said method further comprising a method for generating long duration billing records for said long duration connection call, each of said long duration billing records being generated at a periodically recurring predetermined time, said correlating step further including correlating said call setup and call terminating MSUs with each other in accordance with said further call data, said computing step further including computing long duration elapsed time of said long duration connection call in accordance with the difference between a further start time and a further end time, said further start time based on the timestamp of one of said correlated call setup MSUs received for said long duration connection call for a first of said long duration billing records or on said predetermined time for subsequent ones of said long duration billing records, said further end time based on said predetermined time or on the timestamp of a correlated call terminating MSU received for said long duration connection call, said generating step further including generating said long duration billing records for said long duration connection call including said long duration elapsed time of said long duration connection call.

\* \* \* \* \*